US012812531B2

(12) United States Patent
Elazzouni et al.

(10) Patent No.: US 12,812,531 B2
(45) Date of Patent: *Nov. 24, 2026

(54) USER EQUIPMENT (UE) REPORTING FOR ENHANCED IN-DEVICE COEXISTENCE (IDC)

(71) Applicant: QUALCOMM Incorporated, San Diego, CA (US)

(72) Inventors: Sherif Elazzouni, San Diego, CA (US); Ozcan Ozturk, San Diego, CA (US); Xiao Feng Wang, San Diego, CA (US); Changhwan Park, San Diego, CA (US); Umesh Phuyal, San Diego, CA (US); Bharat Shrestha, San Diego, CA (US); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 18/371,189

(22) Filed: Sep. 21, 2023

(65) Prior Publication Data

US 2024/0373348 A1 Nov. 7, 2024

Related U.S. Application Data

(60) Provisional application No. 63/499,461, filed on May 1, 2023.

(51) Int. Cl.

*H04W 52/02* (2009.01)
*H04W 76/27* (2018.01)

(52) U.S. Cl.

CPC ....... *H04W 52/0216* (2013.01); *H04W 76/27* (2018.02)

(58) Field of Classification Search

CPC .. H04W 52/0216; H04W 76/27; H04W 76/28
See application file for complete search history.

(56) References Cited

U.S. PATENT DOCUMENTS

| | | | |
|---|---|---|---|
| 2012/0207040 | A1 | 8/2012 | Comsa et al. |
| 2014/0301315 | A1 | 10/2014 | Wang et al. |

(Continued)

OTHER PUBLICATIONS

3GPP TSG-RAN WG2 Meeting #121; R2-2301600; Source: vivo; Title: Discussion on IDC TDM Solution; Athens, Greece, Feb. 27-Mar. 3, 2023. (Year: 2023).*

(Continued)

*Primary Examiner* — Mohammed S Chowdhury
(74) *Attorney, Agent, or Firm* — Dinsmore & Shohl LLP

(57) ABSTRACT

Certain aspects of the present disclosure provide techniques for wireless communications by an apparatus. A method includes sending user equipment (UE) assistance information to a network entity, the UE assistance information comprising information indicative of: a requested length of a requested time window; a requested periodicity at which the requested time window repeats; and a first requested communication configuration for communicating during the requested time window; receiving a communication configuration from the network entity; and communicating according to the communication configuration.

22 Claims, 14 Drawing Sheets

(56) References Cited

U.S. PATENT DOCUMENTS

| | | | | |
|---|---|---|---|---|
| 2015/0296556 | A1* | 10/2015 | Lee | H04W 76/18 370/338 |
| 2015/0327280 | A1* | 11/2015 | Zhang | H04L 5/14 370/336 |
| 2019/0349836 | A1* | 11/2019 | Lee | H04W 4/40 |
| 2021/0022146 | A1 | 1/2021 | Hong | |
| 2022/0256546 | A1* | 8/2022 | Jiang | H04W 72/0453 |
| 2023/0007467 | A1 | 1/2023 | He et al. | |
| 2024/0373349 | A1 | 11/2024 | Elazzouni | |
| 2024/0381484 | A1* | 11/2024 | Maleki | H04W 52/0229 |
| 2025/0301530 | A1* | 9/2025 | Kim | H04W 24/02 |

OTHER PUBLICATIONS

3GPP TSG-RAN WG2 Meeting #121; R2-2302264; Source to WG: vivo; Title: Draft 38.331 CR for Rel-18 IDC TDM solution; Athens, Greece, Feb. 27-Mar. 3, 2023 (Year: 2023).*

3GPP TSG-RAN WG2 Meeting #121; R2-2302261; Source: vivo; Title: [AT121][651][IDC]Discussion on TDM solution (vivo, xiaomi) ; Athens , GR, Feb. 27-Mar. 3, 2023. (Year: 2023).*

3GPP TSG RAN WG2 Meeting #121; R2-2300744; Source: Apple; Title: Discussion on TDM solutions in IDC; Athens, Greece, Feb. 27-Mar. 3, 2023. (Year: 2023).*

3GPP TSG RAN WG2 Meeting #78; R2-122360; Source: New Postcom; Title: Discussion on the autonomous denial of LTE transmission/reception; Prague, Czech, May 21-25, 2012 (Year: 2012).*

3GPP TSG-RAN WG2#78; R2-122708; Source: Motorola Mobility; Title: Restrictions on Autonomous Denials; May 21-25, 2012 (Year: 2012).*

3GPP TSG-RAN WG2 Meeting #76; R2-116108; Source: InterDigital Communications, Nokia Siemens Networks and Nokia Corporation; Title: Analysis and discussion on Autonomous Denials; Nov. 14-18, 2011 (Year: 2011).*

3GPP: "3rd Generation Partnership Project, Technical Specification Group Radio Access Network, Evolved Universal Terrestrial Radio Access (E-UTRA) and NR, Multi-Connectivity, Stage 2 (Release 17)", 3GPP TS 37.340, Mar. 2023, pp. 1-120.

3GPP: "3rd Generation Partnership Project, Technical Specification Group Radio Access Network, NR, NR and NG-RAN Overall Description, Stage 2 (Release 17)", TS 38.300 V17.3.0, Dec. 2022, pp. 1-210.

3GPP: "3rd Generation Partnership Project, Technical Specification Group Radio Access Network, NR, Radio Resource Control (RRC) Protocol Specification (Release 16)", 3GPP TS 38.331, V16.12.0, Mar. 2023, pp. 1-968.

Xiaomi: "New WI: In-Device Co-existence (IDC) Enhancements for NR and MR-DC", 3GPP TSG RAN Meeting #94e, RP-213589 (Revision of RP-213552), Electronic Meeting, Dec. 6-17, 2021, 4 Pages.

Elazzouni S (Qualcomm Incorporated)., et al., "FDM IDC Enhancements", 3GPP TSG-RAN WG2 Meeting #121, R2-2300544, Type Discussion, 3rd Generation Partnership Project, Mobile Competence Centre, 650, Route Des Lucioles, F-06921 Sophia-Antipolis Cedex, France, vol. 3GPP RAN 2, No. Athens, GR, Feb. 27, 2023-Mar. 3, 2023, Feb. 17, 2023, pp. 1-7, XP052245189, Autonomous Denials, p. 4, paragraph 4 Option 2: Autonomous Denials, p. 6, paragraph 5.2.

International Search Report and Written Opinion—PCT/US2024/021191—ISA/EPO—Jul. 22, 2024.

* cited by examiner

USER EQUIPMENT (UE) REPORTING FOR ENHANCED IN-DEVICE COEXISTENCE (IDC)

CROSS-REFERENCE TO RELATED APPLICATIONS

This application claims the benefit of and priority to U.S. Provisional Patent Application No. 63/499,461, filed on May 1, 2023, the entire contents of which are incorporated herein by reference.

INTRODUCTION

Field of the Disclosure

Aspects of the present disclosure relate to wireless communications, and more particularly, to techniques for user equipment (UE) reporting for enhanced in-device coexistence (IDC).

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes sending user equipment (UE) assistance information to a network entity, the UE assistance information comprising information indicative of: a requested length of a requested time window; a requested periodicity at which the requested time window repeats; and a first requested communication configuration for communicating during the requested time window; receiving a communication configuration from the network entity; and communicating according to the communication configuration.

Another aspect provides a method for wireless communications by an apparatus. The method includes sending UE assistance information to a network entity, the UE assistance information comprising information indicative of: a requested duration during which the apparatus is allowed to deny up to a requested maximum number of uplink transmissions; and the requested maximum number of uplink transmissions the apparatus is allowed to deny during the requested duration; and receiving an autonomous denial configuration from the network entity, the autonomous denial configuration comprising information indicative of: a duration during which the apparatus is allowed to deny up to a maximum number of uplink transmissions; and the maximum number of uplink transmissions the apparatus is allowed to deny during the duration.

Another aspect provides a method for wireless communications by an apparatus. The method includes receiving UE assistance information from a UE, the UE assistance information comprising information indicative of: a requested length of a requested time window; a requested periodicity at which the requested time window repeats; and a first requested communication configuration for communicating during the requested time window; sending a communication configuration to the UE; and communicating with the UE according to the communication configuration.

Another aspect provides a method for wireless communications by an apparatus. The method includes receiving UE assistance information from a UE, the UE assistance information comprising information indicative of: a requested duration during which the UE is allowed to deny up to a requested maximum number of uplink transmissions; and the requested maximum number of uplink transmissions the UE is allowed to deny during the requested duration; and sending an autonomous denial configuration to the UE, the autonomous denial configuration comprising information indicative of: a duration during which the UE is allowed to deny up to a maximum number of uplink transmissions; and the maximum number of uplink transmissions the UE is allowed to deny during the duration.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for reporting user equipment (UE) assistance information to enhance in-device coexistence (IDC). For example, the UE assistance information may be reported in any suitable message or messages, using any suitable type of signaling (e.g., radio resource control (RRC), medium access control (MAC) control element (CE), uplink control information (UCI), and/or the like).

A UE may communicate (e.g., transmit and/or receive) signals related to different wireless technologies (e.g., telecommunications technologies (e.g., 3G, 4G, and/or 5G), Wi-Fi, Bluetooth, global navigation satellite system (GNSS), etc.). For example, a UE may include circuitry (e.g., radio frequency (RF) circuits, processors, antennas, etc.) for communicating signals associated with each of multiple different wireless technologies. IDC refers to the coexistence of multiple different wireless technologies on the UE, including mitigating interference between the multiple different wireless technologies. For example, signals for one wireless technology may interfere with signals for another wireless technology at the UE. One example of interference is between signals in a non-terrestrial network (NTN) (referred to as NTN signals) and GNSS signals.

An NTN generally provides wireless communication service to areas where terrestrial network service is not available. In an NTN, various types of vehicles, including airborne and space-borne vehicles, such as a satellite, balloon, aircraft, drone, etc., may be used as network entities to communicate with UEs. NTNs may be implemented as extensions to, or otherwise aspects of, an existing wireless communication network, such as a terrestrial wireless communication network, like a cellular network. In this way, NTNs may greatly increase the coverage of wireless communication networks generally.

UEs also utilize signals from other types of non-terrestrial vehicles for enhanced operations, such as receiving global navigation satellite system (GNSS) signals for performing precise location determination. Precise location determination is in-turn used to support many network functions, such as frequency and time synchronization between a UE and a network entity.

Figure 5:
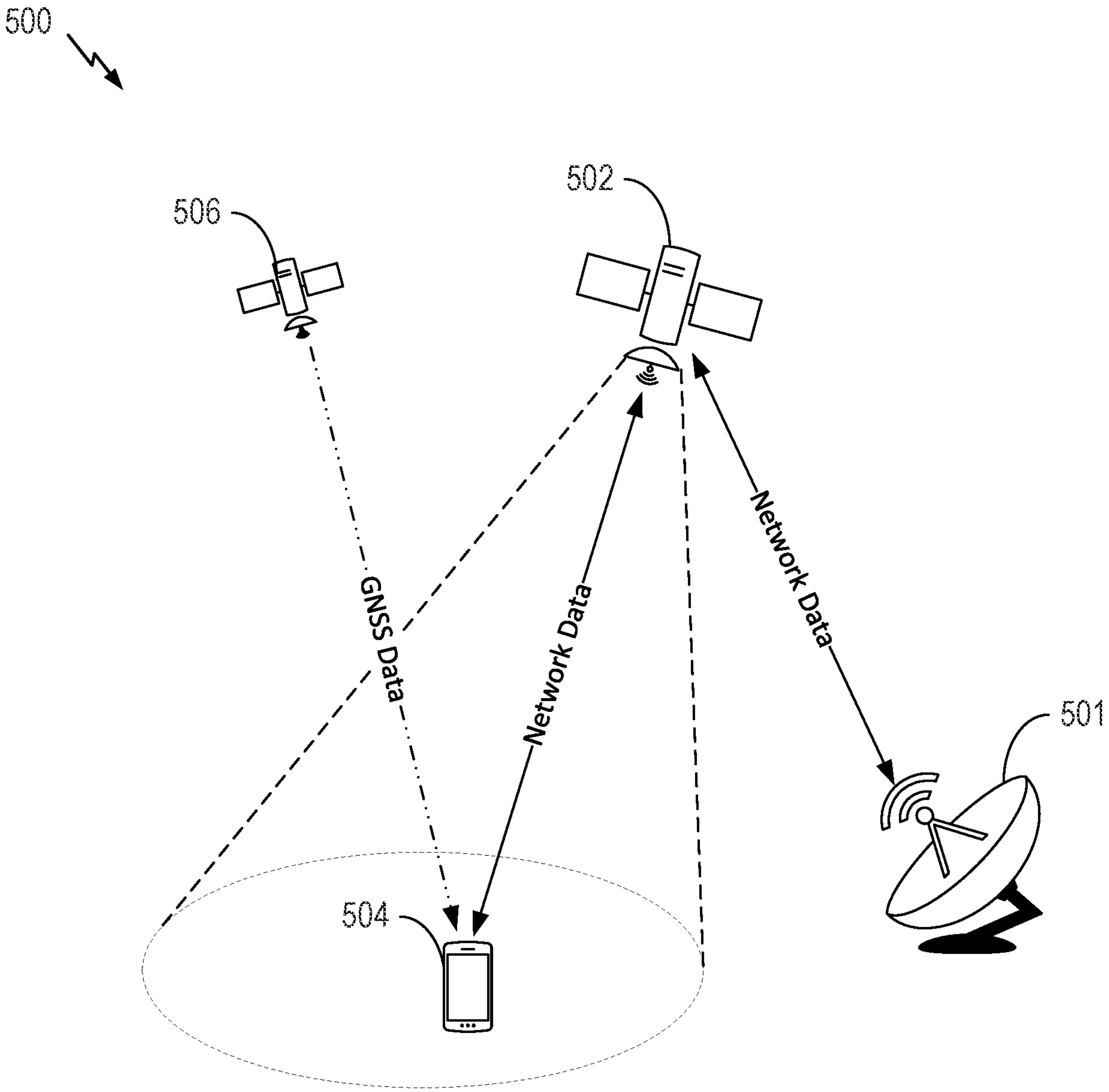
FIG. 5 depicts an example of multi-band communications in a non-terrestrial network (NTN).
Figure 6:
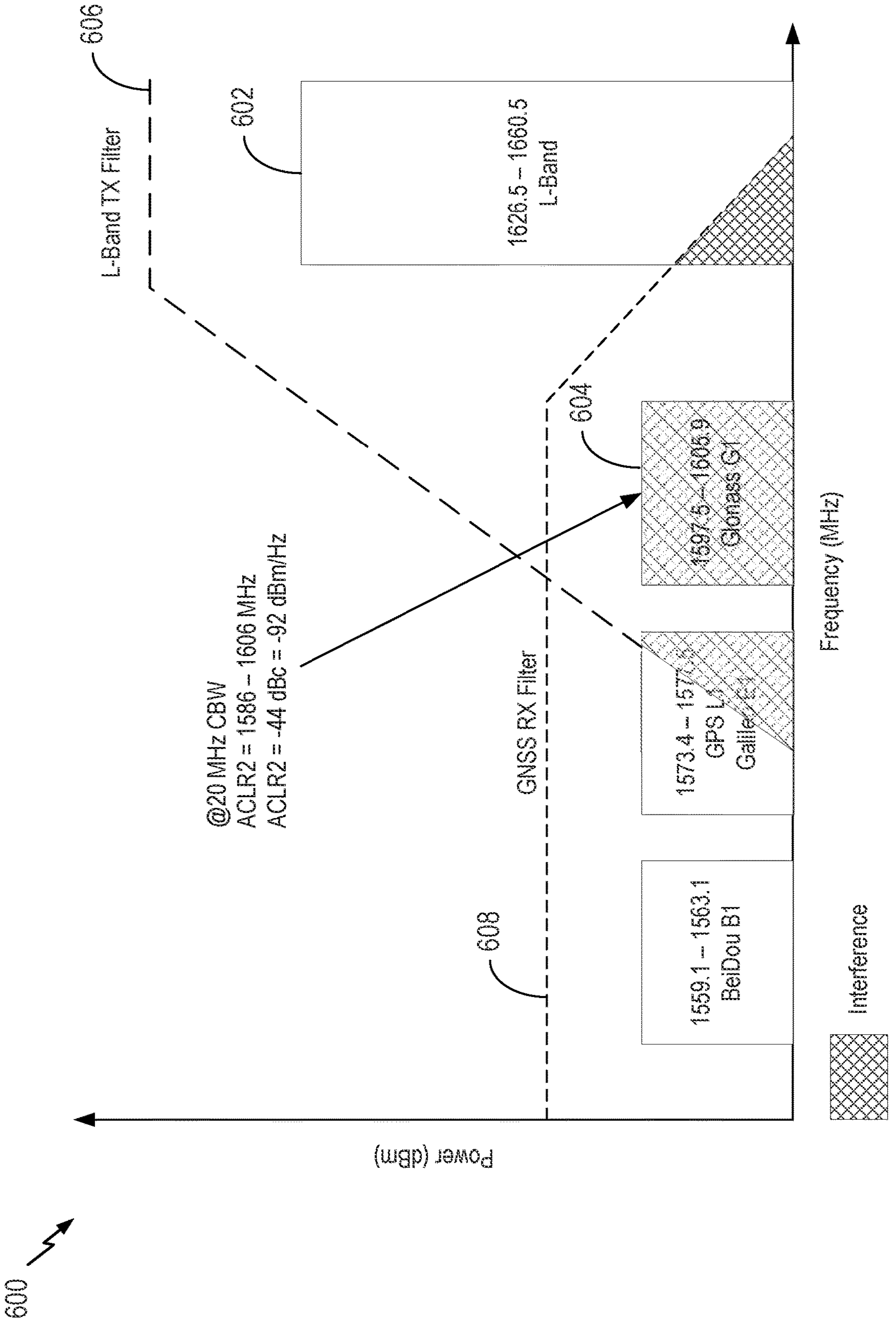
FIG. 6 depicts an example of various wireless communications bands that may be used in multi-band communications, including those in the NTN depicted and described with respect to FIG. 5.

A technical problem arises when a first type of wireless communication (e.g., using a first wireless communication band) between a UE and an entity (e.g., within an NTN) causes wireless interference with a second type of wireless communication (e.g., using a second wireless communication band) between the UE and another entity. In other words, a coexistence problem exists when the UE tries to utilize the two wireless communication bands concurrently. Consider the example in which a UE communicates with a non-terrestrial network entity, such as a satellite, for voice and data over the L-band spectrum, e.g. between 1626.5 MHz and 1660.5 MHz. That same UE may utilize GNSS location to assist with the wireless communication with the non-terrestrial network entity, such as to perform uplink frequency and time synchronization. To obtain the GNSS location, the UE may operate in frequencies close to the L-band's 1626.5 MHz and 1660.5 MHz, such as using the G1 band of the GLONASS satellite navigation system between 1597.5 MHz and 1605.9 MHz. The proximity of these two wireless communication bands increases the likelihood of interference between them when the UE is utilizing both at once, which in-turn may lead to failed wireless communication functions over one or both wireless communication bands, such as reduced or completely lost data throughput and/or lost GNSS location. FIGS. 5 and 6, described further below, depict and describe such an example.

The aforementioned technical problem is not easily solved using conventional methods. Initially, because (as above) the wireless communication bands are regulated, it is not as easy as simply using wireless bands that are further apart and thus non-interfering for the different types of wireless communication. Further, attempting to implement filters (e.g., hardware and/or software-based radio frequency filters) between the different types of wireless communication is often technically impractical, or even infeasible, when the wireless communication bands are near to each other.

In certain aspects, circuitry (e.g., a GNSS receiver) in the UE for receiving GNSS signals may operate according to certain parameters in order to be able to receive and decode GNSS signals properly. In certain aspects, the parameters include a periodicity of a GNSS receive window (e.g., 10 s, etc.) and a length of the GNSS receive window (e.g., 1 s, 2 s, etc.). In certain aspects, the parameters further indicate that during a given GNSS receive window, the UE should not blank more than X ms (e.g., 10 ms, etc.) of every Y ms (e.g., 20 ms, etc.), such as the UE should not transmit NTN signals for at least X ms of any Y ms during the GNSS receive window. The UE blanking during a GNSS receive window refers to the UE refraining from receiving and decoding the GNSS signals, such as to instead perform some other communications. Accordingly, the GNSS receiver may be able to receive GNSS signals during the time the UE does not blank during the GNSS receive window. Therefore, the GNSS receive window is a time period during which the GNSS receiver can receive GNSS signals according to the defined parameters. Though certain aspects, are discussed with the example of a GNSS receive window for receiving GNSS signals, the techniques herein are similarly applicable to other time windows for communicating other types of signals.

Certain aspects described herein overcome the technical problem and thus provide a technical solution by reporting UE assistance information from the UE to a network entity related to communication configurations. In certain aspects, the UE assistance information includes information indicative of a requested length of a requested time window (e.g., GNSS receive window) and a requested periodicity (e.g., periodicity of the GNSS receive window) at which the requested time window repeats. In certain aspects, the UE assistance information further includes information indicative of a first requested communication configuration for communicating during the requested time window. For example, the first requested communication configuration may include a communication configuration where the UE does not blank more than X ms (e.g., 10 ms, etc.) of every Y ms (e.g., 20 ms, etc.). Accordingly, the UE is configured to communicate to the network entity information that allows the network entity to schedule the UE to communicate in one wireless technology (e.g., NTN) in a manner that allows the UE to communicate in another wireless technology (e.g., GNSS) with reduced interference. Further, as the UE assistance information provides a periodicity and length of the time window, the UE can signal the information once for a set of repeating time windows, as opposed to signaling the information for each time window separately, thereby reducing signaling overhead.

For example, the network entity may schedule the UE with a communication configuration where for every time window (e.g., GNSS receive window) that occurs periodically (e.g., at the periodicity of the GNSS receive window), the UE is not scheduled to communicate using the one wireless technology (e.g., NTN) more than X ms (e.g., 10 ms, etc.) of every Y ms (e.g., 20 ms, etc.). Accordingly, the UE is able to use the time period where it is not scheduled to communicate using the one wireless technology to instead communicate on another wireless technology, thereby reducing interference between the two wireless technologies at the UE.

Certain other aspects described herein overcome the technical problem and thus provide a technical solution by reporting UE assistance information from the UE to a network entity related to autonomous denials. In certain aspects, the UE assistance information includes information indicative of a requested duration (e.g., GNSS receive window) during which the UE is allowed to deny up to a requested maximum number of uplink transmissions. The UE denying an uplink transmission refers to the UE refraining from performing an uplink transmission during a time period the UE is scheduled to make an uplink transmission. By the UE denying an uplink transmission, the UE can instead use that time period to communicate according to another wireless technology. Accordingly, the UE is configured to communicate to the network entity information that allows the network entity to provide the UE flexibility to not communicate in one wireless technology at certain times, which allows the UE to communicate in another wireless technology (e.g., GNSS) with reduced interference. In certain aspects, the UE assistance information provides a periodicity at which the UE requests to be configured with the duration during which the UE is allowed to deny up to a requested maximum number of uplink transmissions. For example, the periodicity may be the periodicity of the GNSS receive window. Accordingly, the UE can signal the information once for a set of repeating durations, as opposed to signaling the information for each duration separately, thereby reducing signaling overhead.

For example, the network entity may send to the UE an autonomous denial configuration that configures the UE with a duration of time the UE is allowed to deny up to a maximum number of uplink transmissions. Accordingly, the UE is able to deny uplink transmissions to instead communicate on another wireless technology, thereby reducing interference between the two wireless technologies at the UE.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
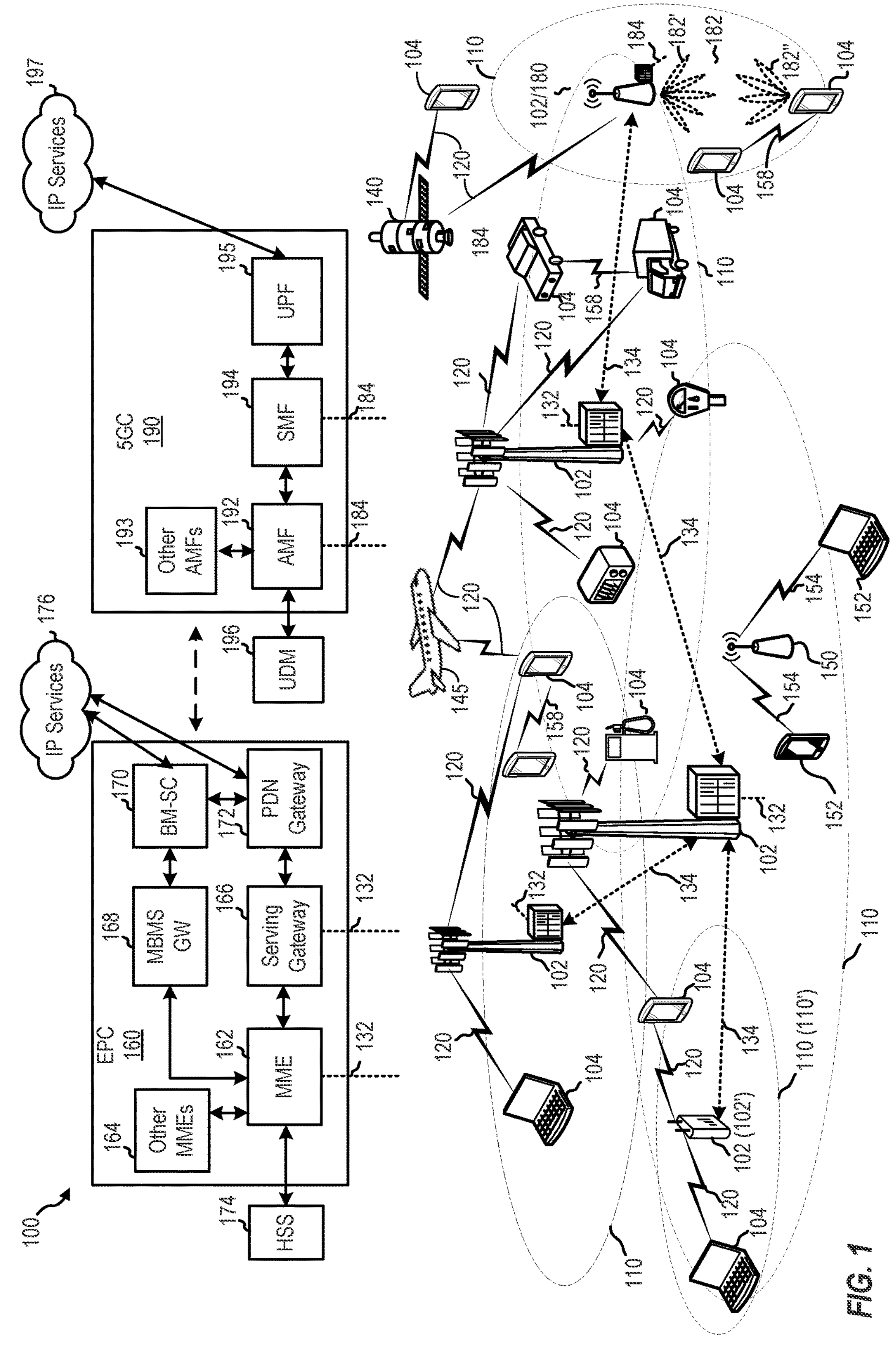
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
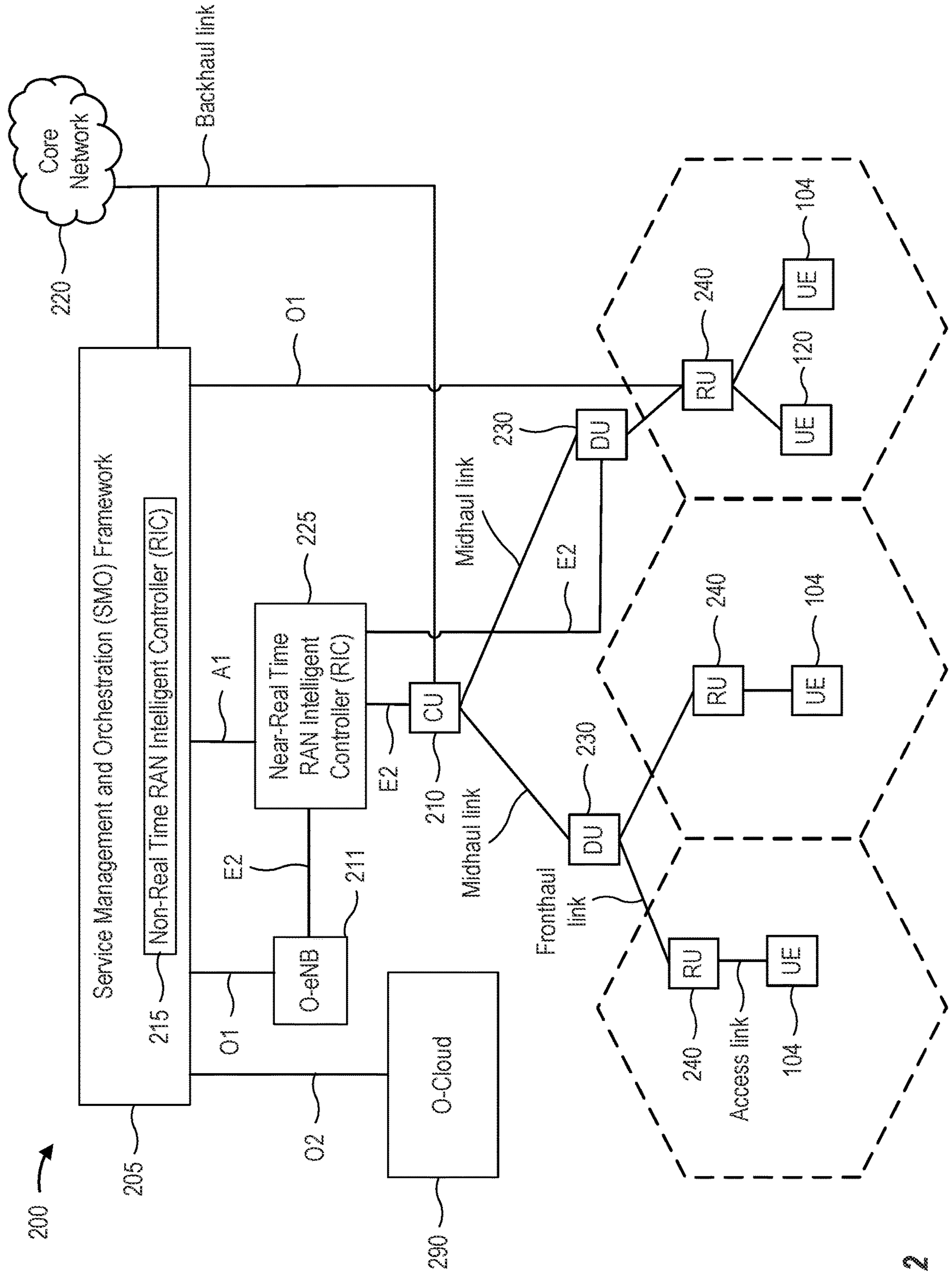
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as “Sub-6 GHz”. Similarly, 3GPP currently defines Frequency Range 2 (FR2) as including 24,250 MHz-71,000 MHZ, which is sometimes referred to (interchangeably) as a “millimeter wave” (“mmW” or “mmWave”). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
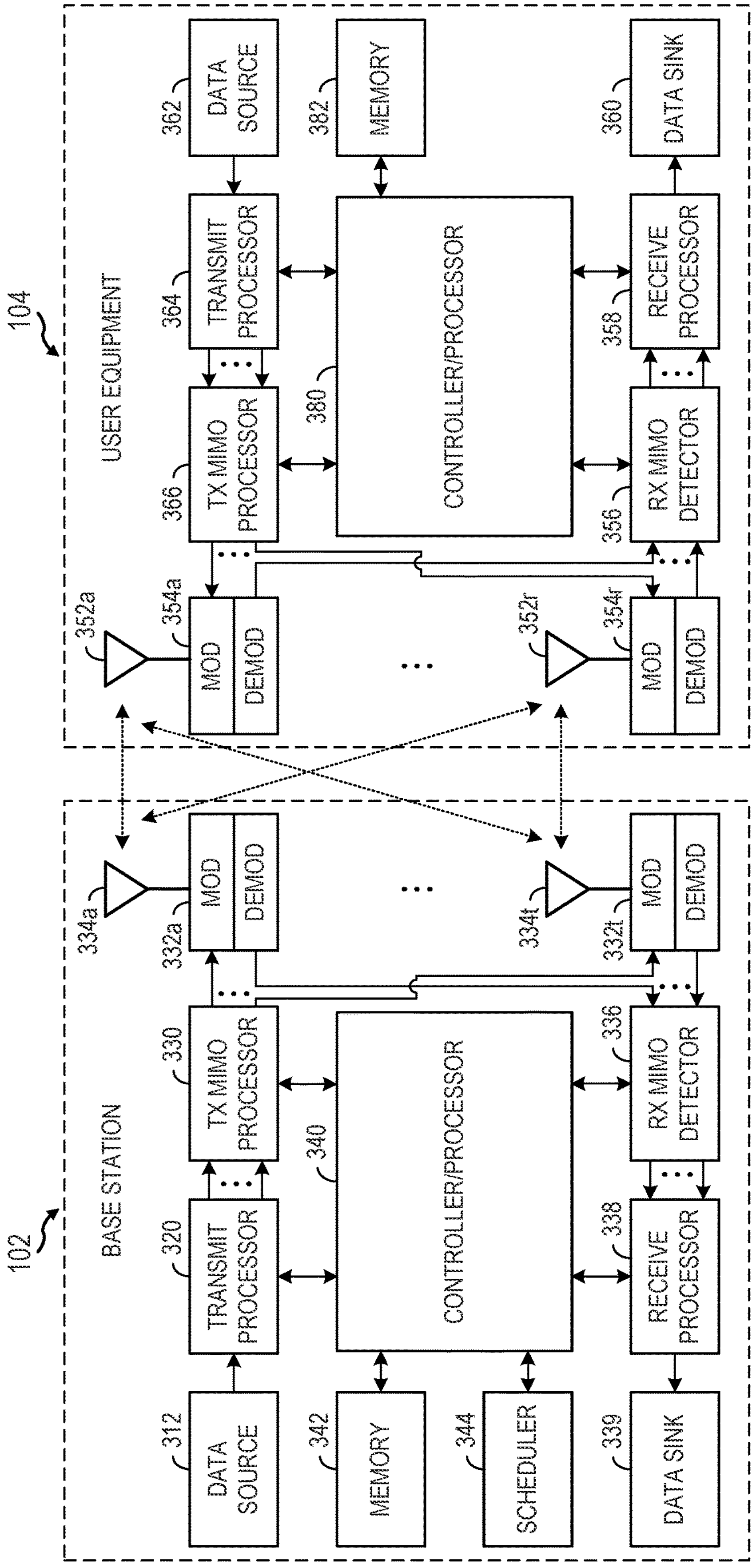
FIG. 3 depicts aspects of an example base station and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
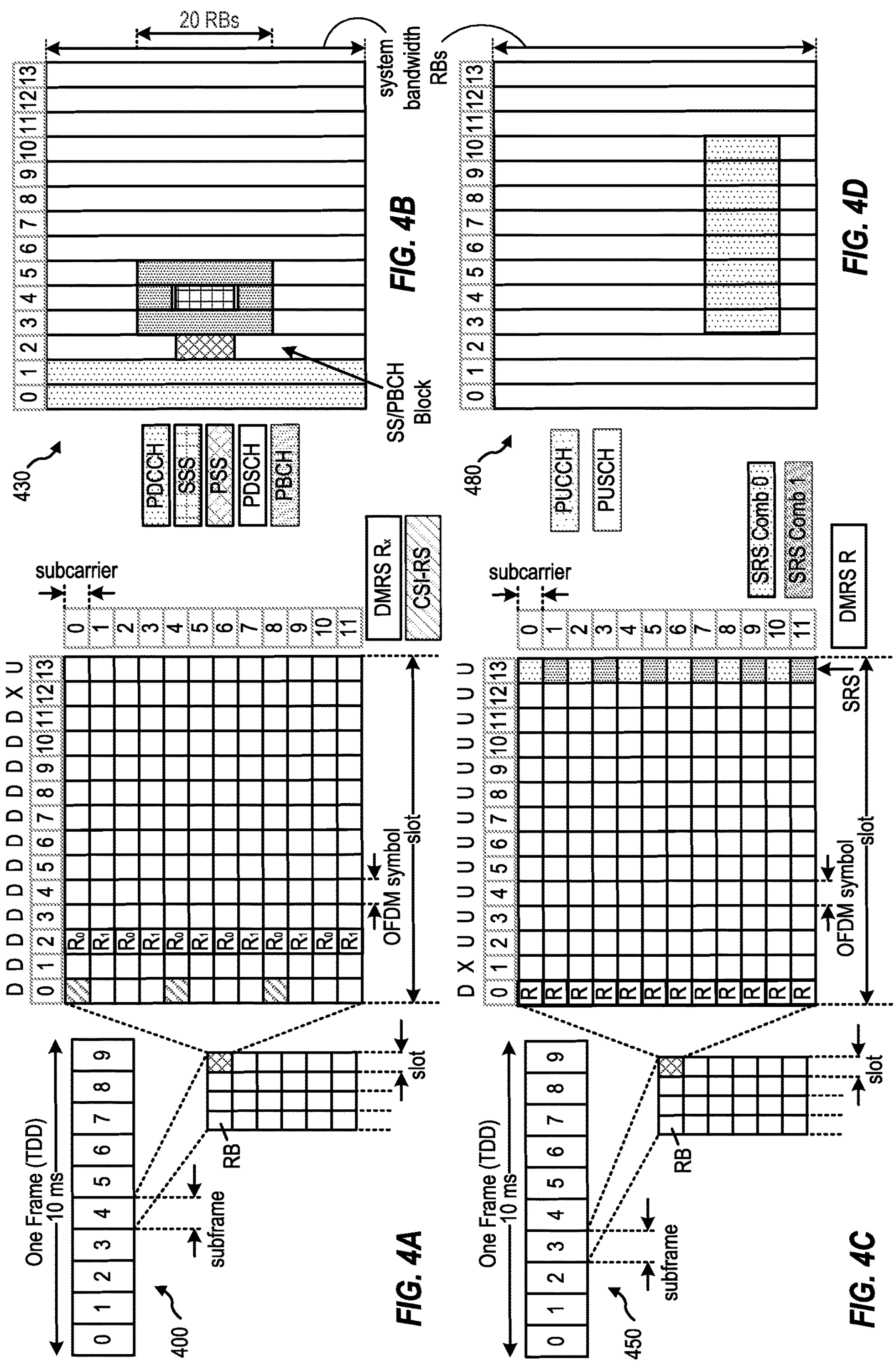
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology u, there are 2" slots per subframe. Thus, numerologies (μ) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu} \times 15$ kHz, where u is the numerology 0 to 6. As an example, the numerology $\mu=0$ corresponds to a subcarrier spacing of 15 kHz, and the numerology $\mu=6$ corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology $\mu=2$ with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Reducing Wireless Interference with Coexistence Periods

As briefly discussed above, aspects described herein enable coexistence of multi-band communications between UEs and network entities and beneficially reduce wireless interference in wireless communication networks.

FIG. 5 depicts an example 500 of multi-band communications in an NTN. In particular, UE 504 is communicating (e.g., voice and data) with the NTN via NTN entity 502 (a satellite in this example) and ground station 501 while also receiving GNSS data from GNSS vehicle 506.

In this example, NTN entity 502 is a non-terrestrial vehicle. Ground station 501 and/or NTN entity 502 is configured to perform the function of a base station, such as BS 102 described above with respect to FIGS. 1 and 3. Further in this example, GNSS vehicle 506 is a satellite (a type of non-terrestrial vehicle) configured to provide geo-location signals. Further in this example, UE 504 is a UE such as UE 104 described above with respect to FIGS. 1 and 3.

As described above, GNSS data from GNSS vehicle 506 may assist UE 504 with performing the communications with the NTN by providing precise location of UE 504, which can be used for synchronizing time and frequency configurations for communications with non-terrestrial network entity 502.

Note that while a satellite is shown in this example as non-terrestrial network entity 502, other types of non-terrestrial network entities are equally applicable, such as aircraft, drones, balloons, and others.

FIG. 6 depicts an example 600 of various wireless communications bands that may be used in multi-band communications, including those in the NTN depicted and described with respect to FIG. 5.

In one example, a UE may communicate with an NTN over L-band 602 (with a bandwidth of 1626.5 MHz to 1660.5 MHz in this example) using an L-band duplexer. The L-band duplexer may have uplink characteristics that lead to out of band and spurious emissions. As depicted, the frequency emission range of the L-band communications, even with an L-band TX filter as depicted by line 606, results in significant interference with GNSS frequency ranges, especially the GLONASS G1 band 604, which is between 1597.5 MHz and 1605.9 MHz in this example.

For example, the out of band emission from a 20 MHz bandwidth L-band uplink transmission at 25 dBm may result in an interference power density of −92 dBm/Hz over the GLONASS G1 frequency, which is higher than a desired noise level of −185 dBm/Hz for proper GNSS signal reception. In this example, GNSS reception interruption caused by the L-band uplink transmission may severely deteriorate a UE's positioning accuracy, which in-turn degrades its uplink transmission performance.

Note that while GLONASS G1 is depicted as the primarily affected GNSS band, other GNSS bands, such as GPS and Galileo are impacted as well as indicated in FIG. 6.

As briefly described above, RF filters for a GNSS receiver (RX) and an L-band transmitter (TX) may generally not be effective at suppressing the interference between the respective bandwidths. For example, as depicted, L-band TX filter line 606 and GNSS band RX filter line 608 show overlap in each other's bandwidths, leading to the aforementioned wireless interference and loss in wireless performance.

Notably, while a UE may be able to use alternative GNSS bands having larger separation from an L-band transmitter's operating range, such as L5 GNSS bands (e.g., between 1164-1189 MHZ), various network services may require the use of the adjacent bands, such as depicted in FIG. 6. For example, E911 service may only be available through L1 GNSS bands (e.g., 1559-1610 MHz) like those depicted in FIG. 6.

Figure 7A:
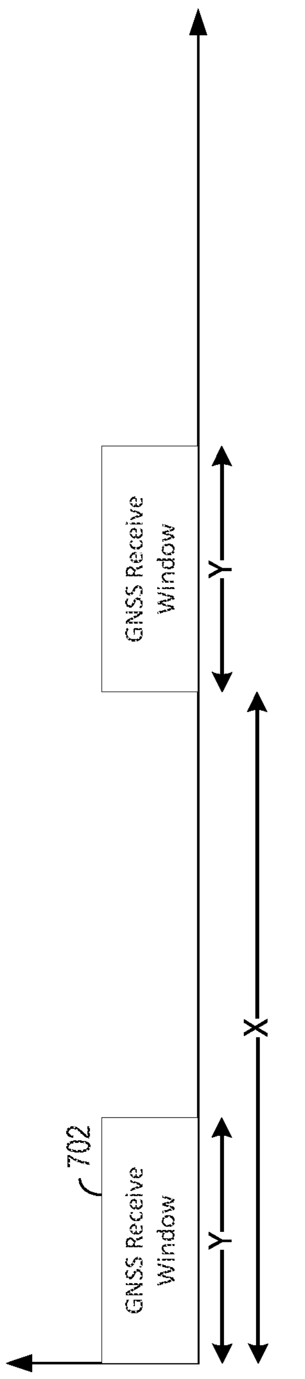
FIG. 7A illustrates an example of a periodically occurring receive window.
Figure 7B:
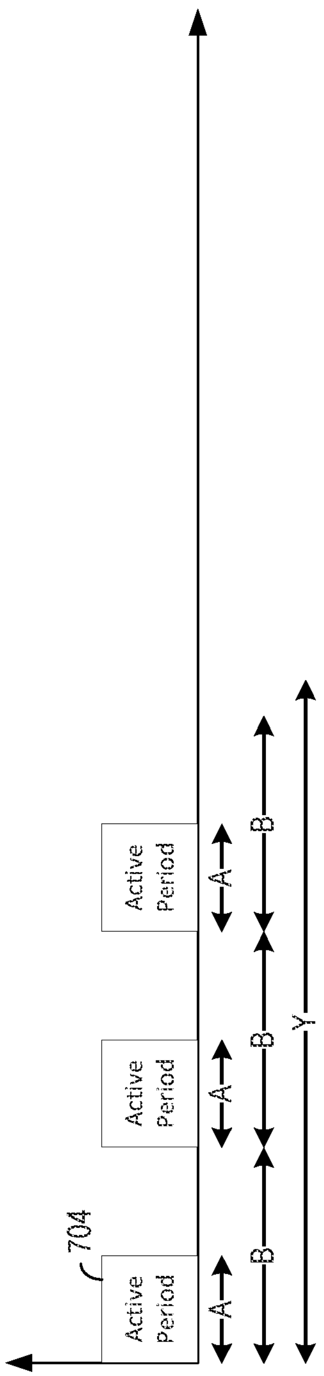
FIG. 7B illustrates an example of a communication configuration for a UE during a receive window.

In certain aspects, in order for a UE to receive and decode sufficient GNSS data to determine a precise location of the UE, the UE operates according to a minimum set of parameters. For example, FIG. 7A illustrates a periodically occurring GNSS receive window 702. In particular, the minimum set of parameters may indicate that GNSS receive window 702 has a length or duration of Y (e.g., 2 s). Further, the start of each instance of the GNSS receive window 702 occurs periodically every time period X (e.g., 10 s). Further, FIG. 7B illustrates a communication configuration for the UE during a GNSS receive window 702. In particular, the minimum set of parameters may indicate that during each GNSS receive window 702, the UE should not blank receiving GNSS signals (e.g., such as by transmitting NTN signals) for more than A (e.g., 10 ms) of every B (e.g., 20 ms). Accordingly, as shown in FIG. 7B, an active period 704 occurs periodically. The active period 704 has a length or duration of A. Further, the start of each instance of active period 704 occurs periodically every time period B. In certain aspects, the UE may be configured to blank receiving GNSS signals (e.g., transmit NTN signals) during active periods 704, and may receive GNSS signals during any remaining time of the GNSS receive window 702 (e.g., the remaining time of each time period B).

As briefly discussed, certain aspects herein relate to techniques for configuring a UE with a communication configuration that allows the UE to operate according to a minimum set of parameters to receive and decode signals for a wireless technology, such as sufficient GNSS data to determine a precise location of the UE.

Aspects Related to Time Domain Multiplexing (TDM)

In certain aspects, a UE may be configured with a communication configuration, such as to allow the UE to operate according to the minimum set of parameters to receive and decode signals (e.g., GNSS signals) for a wireless technology. In certain aspects, the UE may be configured to operate according to a TDM configuration, whereby the UE switches between communicating using different wireless technologies at different times. In an example, the UE may be configured with a discontinuous reception (DRX) configuration.

In certain aspects, the UE may be able to operate in an ON or active state or one or more low power states (e.g., OFF or sleep states) and support DRX (e.g., connected mode DRX (cDRX)). For example, in some aspects, the UE may (e.g., cyclically) switch between one or more designated active periods where the UE is supposed to be in an ON or active state (e.g., to monitor downlink channels (e.g., physical downlink control channel (PDCCH)) between the UE and the network entity)) and one or more designated sleep periods (wherein the UE can be in an OFF or sleep state (e.g., to stop monitoring downlink channels and instead receive other wireless signals such as GNSS data)) according to DRX cycles, where the UE supports DRX. The UE may support a long DRX cycle, and optionally may also support a short DRX cycle (e.g., if the UE is configured for the short DRX cycle). A DRX cycle may refer to one cycle of an ON state and a possibility of an OFF state of the UE. The short DRX cycle may be a shorter time period than the long DRX cycle, and the OFF state of a long DRX cycle may commence after multiple short DRX cycles.

DRX may be configured (e.g., by the network entity) at the UE as a set of DRX parameters. The DRX parameters may include an inactivity timer, a short DRX cycle parameter, a DRX short cycle timer, a long DRX cycle start offset, an on duration timer, etc.

The inactivity timer may specify a time period (e.g., in ms, number of subframes, number of slots, etc.) for which the UE should remain in the ON state after successfully monitoring and decoding a downlink channel (e.g., PDCCH) that indicates (e.g., using a PDCCH grant) there is a new transmission (e.g., UL or DL) scheduled between the UE and the network entity. The UE may restart the inactivity timer each time the UE receives an indication for a new transmission while in the ON state. When the timer expires, the UE may enter the OFF state. The inactivity timer may be applicable to both the long DRX cycle and the short DRX cycle.

The short DRX cycle parameter may indicate the length (e.g., in ms, number of subframes, number of slots, etc.) of a short DRX cycle, which includes a time the UE is in the ON state followed by a time the UE is possibly in the OFF state.

The DRX short cycle timer indicates a number of short DRX cycles the UE should enter (e.g., following an initial short DRX cycle) before entering a long DRX cycle.

The long DRX cycle start offset indicates the length (e.g., in ms, number of subframes, number of slots, etc.) of a long DRX cycle, which includes a time the UE is in the ON state followed by a time the UE is possibly in the OFF state, and optionally includes the starting subframe/slot for the long DRX cycle.

The on duration timer indicates the length (e.g., in ms, number of subframes, number of slots, etc.) the UE will be in the ON state before entering the OFF state for a DRX cycle. The on duration timer may be applicable to both the long DRX cycle and the short DRX cycle.

The UE may also enter the OFF state (e.g., while the on duration timer and/or inactivity timer have not yet expired) based on receiving an explicit command to enter the OFF state from a network node (e.g., the network entity) (e.g., in a media access control (MAC) control element (MAC-CE)).

In certain aspects, the time period of the DRX cycle (e.g., long and/or short) may be configurable (e.g., over a wide range, such as 4 ms to a few seconds).

For example, the UE may at the start of an initial short DRX cycle enter an ON state, and the on duration timer and the inactivity timer for the short DRX cycle may be started. Once both timers have expired, the UE may enter the OFF state. At the end of the short DRX cycle, a new DRX cycle may start (e.g., another short DRX cycle or a long DRX cycle based on the DRX short cycle timer). The on duration timer and the inactivity timer may be restarted for the DRX cycle. Once both timers have expired, the UE may enter the OFF state. Accordingly, the UE may periodically cycle between the ON state and OFF state according to the DRX configuration of the UE.

In certain aspects, the UE is able to communicate in one wireless technology (e.g., NR) during the ON state, and is able to communicate in another wireless technology (e.g., GNSS) during the OFF state. Therefore, the UE uses TDM for communicating in multiple wireless technologies by means of switching between communicating in the wireless technologies, such as according to a DRX configuration.

Aspects Related to UE Reporting of UE Assistance Information

In certain aspects, a UE is configured to report (e.g., using RRC signaling) UE assistance information (UAI) (e.g., idc-TDM-AssistanceConfig) to a network entity, and the network entity is configured to send a communication configuration (e.g., DRX configuration) to the UE based on the UE assistance information. For example, the network entity may send signaling (e.g., RRC signaling) that configures the UE to report (e.g., periodically) UE assistance information to the network entity. The signaling configuring the UE to report UE assistance information may include an OtherConfig information element (IE) in RRC signaling indicating to the UE to report an idc-TDM-AssistanceConfig.

In certain aspects, the UAI includes information indicative of a requested duration (e.g., an active duration parameter) for an active time period. As used herein, the UAI including "information indicative of" X may refer to the UAI including the actual value X, or indicating a value that maps to the value X. In certain aspects, the UAI further includes information indicative of a requested cycle length (e.g., a cycle length parameter) at which the start of the active time period repeats periodically. Accordingly, the requested cycle length is for a communication cycle comprising the active time period and an inactive time period. For example, where the requested duration for the active time period is A, and the requested cycle length is B, the UAI may indicate a requested communication configuration like in FIG. 7B, where the active time period has a duration A in each communication cycle having a duration B, and where the time period outside the duration A in the communication cycle is considered an inactive time period (e.g., where the UE can receive GNSS signals). In certain aspects, the UAI further includes requested offset information (e.g., startoffset parameter and/or slotoffset parameter) indicating an offset, from the start of the communication cycle, where the active time period starts in each communication cycle.

In certain aspects, such as in response to the UAI, the network entity configures the UE with a communication configuration, such as a DRX configuration to communicate, such as according to the requested communication configuration. For example, the network entity may configure the UE with a long DRX cycle length of duration B and an on duration timer of duration A, which may indicate a communication configuration like in FIG. 7B.

In certain aspects, in order for the UE to request to operate according to the minimum set of parameters to receive and decode signals for a wireless technology, the UE may send UAI to the network entity prior to the start of each instance of a time window, such as a GNSS receive window 702 in FIG. 7A. For example, the UE may send UAI indicating a requested duration A for an active time period and a requested cycle length B prior to each GNSS receive window 702. Accordingly, the network entity may send signaling configuring the UE to communicate according to the communication configuration as in FIG. 7B prior to the start of each GNSS receive window 702, thereby allowing the UE to operate according to the minimum set of parameters to receive and decode signals for a wireless technology. The UE may further send UAI (e.g., empty UAI with no parameters) cancelling the requested communication configuration at the end of each GNSS receive window 702, so the UE can communicate using a different configuration outside of the GNSS receive windows 702. Accordingly, the network entity may send signaling configuring the UE to communicate according to a different communication configuration at the end of each GNSS receive window 702, thereby allowing the UE to operate according to a different configuration outside of the GNSS receive windows 702. Accordingly, for each GNSS receive window, the UE and network entity may exchange four messages in order to ensure the UE operates according to the minimum set of parameters to receive and decode signals for a wireless technology.

In certain aspects, to solve the technical problem of overhead of exchanging messages between the UE and network entity for each time window, such as a GNSS receive window, additional information may be included in the UAI. For example, in certain aspects, in addition to the information indicative of a requested duration for an active time period and a requested cycle length at which the start of the active time period repeats periodically, the UAI includes information indicative of a requested length of a requested time window (e.g., also referred to as a validity window), such as a requested length Y of a GNSS receive window 702 in FIG. 7A. The UAI may further include information indicative of a requested periodicity (e.g., corresponding to a periodically occurring communication cycle with a length equal to the periodicity, the communication cycle referred to as a validity cycle) at which the requested time window repeats, such as requested duration X at which the GNSS receive window 702 repeats in FIG. 7A. Accordingly, the requested periodicity indicates a second requested cycle length of a second requested communication cycle (e.g., validity cycle), the second requested communication cycle comprising a first requested time period (e.g., validity window) for communicating according to a first requested communication configuration/cycle (e.g., as in FIG. 7B) and a second requested time period (e.g., for communicating according to a different communication configuration). Further, the requested length of the requested time window comprises information indicative of a second requested duration (e.g., Y) for the first requested time period (e.g., validity window) of the second requested communication cycle.

Accordingly, the UE provides information to the network entity not only of the communication configuration (e.g., as in FIG. 7B) to use in a time window (e.g., validity window, such as GNSS receive window 702 of FIG. 7A), but also information as to when the time window occurs periodically and a length of the time window. Therefore, the UE may only need to provide the information for the communication configuration to use in a time window to the network entity once, as opposed to at the start and end of each time window, thereby reducing signaling overhead.

In certain aspects, the UE may further send offset information (e.g., an IDCGapOffset) to the network entity, the offset information indicating, for at least one communication cycle (e.g., validity cycle of duration X), a start time of the requested time period (e.g., validity window). For example, the offset information may include a time from the start of the validity cycle that the validity window starts. For example, the offset information indicates where a GNSS receive window starts in a cycle. The offset information may allow flexibility as to where the validity window starts, such so as to be able to better schedule the UE to communicate around receiving GNSS data, thereby reducing interference.

In certain aspects, the offset information is static, and applies to multiple requested time periods (e.g., validity windows of duration Y) over multiple communication cycles (e.g., multiple validity cycles of duration X). For example, the offset information may be included in the UAI, or in separate signaling (e.g., RRC, MAC-CE, UCI, etc.). Static offset information may reduce overhead for signaling offset information for each time period.

In certain aspects, the offset information is dynamic and applies to one or more (e.g., only one) requested time periods (e.g., validity windows). For example, the offset information may be sent in signaling (e.g., RRC, MAC-CE, UCI, etc.). For example, the UE may send the offset information prior to a start of a given validity window for which the offset information is to apply, or prior to different groups of validity windows for which the offset information is to apply.

Aspects Related to Configuring a UE Based on UE Assistance Information

In certain aspects, the network entity is configured to send signaling indicating a different communication configuration (e.g., DRX configuration) prior to the start of each requested time period (e.g., validity window) and at the end of each requested time period, such as according to the UAI, to configure the UE to communicate according to different configurations within the validity window and outside of the validity window.

In certain aspects, to solve the technical problem of overhead of exchanging messages between the UE and network entity for each validity window, such as GNSS receive window, the network entity may be configured to configure the UE to periodically use a particular communication cycle (e.g., DRX cycle), thereby reducing signaling overhead so as to signal the communication configuration once for multiple validity windows. For example, the network entity may configure the UE with a DRX configuration indicating a first cycle length of a first communication cycle comprising a first on period and a first off period and a first duration for the first on period of the first communication cycle. For example, the first cycle length may be the duration B of FIG. 7B, and the first duration may be the duration A of an active period 704 of FIG. 7B. The first DRX configuration may further indicate a second cycle length of a second communication cycle comprising a first time period (e.g., validity window) for communicating according to the first communication cycle and a second time period remainder of the second communication cycle) and a second duration for the first time period of the second communication cycle. For example, the second cycle length may be the duration X of FIG. 7A, and the second duration may be the duration Y of the GNSS receive window 702 of FIG. 7A.

In certain aspects, the network entity further includes in the DRX configuration a third cycle length of a third communication cycle comprising a second on period and a second off period; and a third duration for the second on period of the third communication cycle, wherein the second time period is for communicating according to the third communication cycle. For example, the DRX configuration may indicate a different DRX cycle (e.g., long and/or short) for the UE to use during time periods outside the validity window than to use during the validity window.

In certain aspects, the network entity is configured to dynamically indicate to the UE which DRX cycle to communicate according to within a requested time period (e.g., validity window). This may provide flexibility for scheduling the UE to communicate according to different DRX cycles dynamically. For example, the network entity may send to the UE signaling prior to a first occurrence of the second communication cycle (e.g., validity cycle, such as duration X of FIG. 7A), the signaling indicating whether to communicate according to the first communication cycle (e.g., according to FIG. 7B) or the third communication cycle (e.g., a different DRX cycle) during the first time period (e.g., validity window, such as duration Y of FIG. 7A) of the first occurrence of the second communication cycle. The signaling may be MAC-CE, downlink control information (DCI), a wakeup signal (WUS), or the like. In certain aspects, the different DRX cycle configurations, or other communication configurations, are configured at the UE, such as using RRC signaling, and the signaling for dynamically indicating which communication configuration the UE should use in a particular requested time period indicates which of the configured communication configurations to use, such as using an index.

In certain aspects, the network entity may further send, to the UE, offset information (e.g., an IDCGapOffset), the offset information indicating when a time window (e.g., validity window, such as of duration Y), for at least one communication cycle (e.g., validity cycle, such as of duration X), starts. For example, the offset information indicates where a validity window starts in a validity cycle. The offset information may include a time from the start of the validity cycle that the validity window starts. The offset information may allow flexibility as to where the validity window starts, so as to be able to better schedule the UE around communicating data (e.g., receiving GNSS data), thereby reducing interference.

In certain aspects, the offset information indicates to the UE that the UE can select when the time window starts in the communication cycle. Accordingly, in certain aspects, the UE sends offset information to the network entity prior to the beginning of a communication cycle (e.g., validity cycle), the offset information indicating when the UE has selected the time window (e.g., validity window) to start in the communication cycle, and optionally in one or more additional communication cycles.

Aspects Related to Short DRX Cycle Request

In certain aspects, to solve the technical problem of overhead of exchanging messages between the UE and network entity for each time window, such as a GNSS receive window, certain information may be included in the UAI. For example, in certain aspects, the UAI includes information indicative of a requested length of a requested time window (e.g., validity window), such as a requested length Y of a GNSS receive window 702 in FIG. 7A. The UAI may further include information indicative of a requested periodicity (e.g., validity cycle) at which the requested time window repeats, such as requested duration X at which the GNSS receive window 702 repeats in FIG. 7A. The UAI further includes information indicative of a first requested communication configuration for communicating during the requested time window.

In certain aspects, the first requested communication configuration may be a short DRX cycle configuration. For example, the UAI may include a short cycle parameter and a short cycle timer parameter. In an example, the short cycle parameter may take any of the following enumerated values: {ms0, ms1, ms2, ms3, ms4, ms5, ms6, ms8, ms10, ms20, ms30, ms40, ms50, ms60, ms80, ms100, ms200, ms300, ms500, ms750, ms1280, ms1920, ms2560, spare9, spare8, spare7, spare6, spare5, spare4, spare3, spare2, spare1}. In an example, the short cycle timer parameter may take any of the following integer values: 1 to 16.

Figure 8:
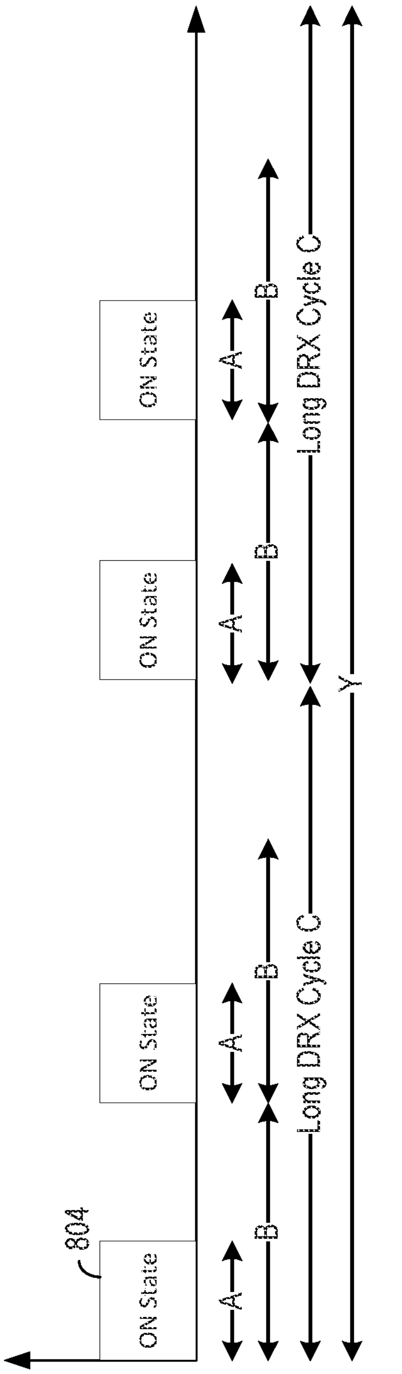
FIG. 8 illustrates an example communication configuration for the UE during a time window.

For example, FIG. 8 illustrates a communication configuration for the UE during a time window. As shown, the time window (e.g., validity window) has a duration Y. In certain aspects, the communication configuration is a DRX configuration, where the short DRX cycle length is B, the on duration has length A (e.g., during which the UE is in an ON state 804), the DRX short cycle timer is 2, and the long DRX cycle length is C.

In certain aspects, where the first requested communication configuration is a short DRX cycle configuration, the information indicative of the first requested communication configuration includes information indicative of a first requested cycle length of a first requested communication cycle, the first requested communication cycle comprising a first requested active time period and a first requested inactive time period. The first requested cycle length may be the short DRX cycle length (e.g., B as shown in FIG. 8). Accordingly, the first requested communication cycle may be a short DRX cycle, where in the first requested active time period the UE may be in an ON state, and in the first requested inactive time period the UE may be in an OFF state. The information indicative of the first requested communication configuration further includes a first requested duration for the first requested active time period of the first requested communication cycle. Accordingly, the first requested duration may be the on duration (e.g., A as shown in FIG. 8). In certain aspects, the UAI further comprises information indicative of a third requested cycle length (e.g., C as shown in FIG. 8) of a requested long DRX cycle. In certain aspects, the UAI further comprises information indicative of a requested maximum number of requested short DRX cycles to occur before entering a requested long DRX cycle, such as the DRX short cycle timer.

Accordingly, the requested periodicity indicated in the UAI indicates a second requested cycle length of a second requested communication cycle (e.g., validity cycle), the second requested communication cycle comprising a first requested time period (e.g., validity window) for communicating according to a first requested communication cycle (e.g., DRX configuration with the short DRX cycle) and a second requested time period (e.g., for communicating according to a different communication configuration). Further, the requested length of the requested time window comprises information indicative of a second requested duration (e.g., Y) for the first requested time period (e.g., validity window) of the second requested communication cycle.

By using a short DRX cycle configuration during a validity window, the UE may wake up fewer times during the validity window than, for example, the configuration in FIG. 7B, thereby providing power savings at the UE.

In certain aspects, if the cycle length parameter included in the UAI to indicate the length of the requested long DRX cycle is infinity, the network entity determines that the validity window only occurs once, and does not repeat periodically.

In certain aspects, the UAI further indicates an interference direction (e.g., NR communication interfere with other communications, other communications interfere with NR communications, or both) at the UE.

In certain aspects, the UAI further indicates a victim system type (e.g., Bluetooth, WLAN, GNSS, etc.) indicating a wireless technology having coexistence issues with NR at the UE.

Aspects Related to Technology Specific Gap Request

In certain aspects, to solve the technical problem of overhead of exchanging messages between the UE and network entity for each time window, such as a GNSS receive window, certain information may be included in the UAI. In certain aspects, the UAI includes information indicative of the minimum set of parameters for communicating according to a particular technology, e.g., GNSS. For example, in certain aspects, the UAI includes information indicative of a requested length of a requested time window (e.g., validity window), such as a requested length Y of a GNSS receive window 702 in FIG. 7A. The UAI may further include information indicative of a requested periodicity (e.g., for a validity cycle) at which the requested time window repeats, such as requested duration X at which the GNSS receive window 702 repeats in FIG. 7A. The UAI further includes information indicative of a first requested communication configuration for communicating during the requested time window.

In certain aspects, the information indicative of the first requested communication configuration includes information indicative of a requested length of a requested gap period during which the UE is not to be scheduled for uplink transmission; and a requested periodicity at which the requested gap period repeats within the requested time window. The requested length of the requested gap period may be, for example, the period the UE should not blank receiving GNSS signals for every requested periodicity. In certain aspects, the UAI further includes information indicative of, for at least one occurrence of a requested communication cycle corresponding to the requested periodicity, a start time of the requested time window. For example, the UAI includes information indicative of a specific start time in the GNSS receive window 702 of when the requested gap period starts. In certain aspects, the network entity configures the UE with a communication configuration indicating a length of a time window (e.g., corresponding to the requested time window), a periodicity at which the time window repeats (e.g., corresponding to the requested periodicity at which the requested time window repeats), a length of a gap period during which the UE is not to be scheduled for uplink transmission (e.g., corresponding to the requested length of the requested gap period), and a periodicity at which the gap period repeats within the time window (e.g., corresponding to the requested periodicity at which the requested gap period repeats within the requested time window).

In certain aspects, the information indicative of the first requested communication configuration includes information indicative of a requested duty cycle the UE is not to be scheduled for uplink transmission during the time window. For example, the duty cycle within the requested time window may be Z %, such that the UE is not scheduled for uplink transmission for Z % of the time window. The information indicative of the first requested communication configuration may further include information indicative of a requested maximum consecutive duration (e.g., corresponding to how long GNSS can take between 2 samples) the UE can be scheduled for uplink transmission during the time window. For example, where the duty cycle is 50%, and the requested maximum consecutive duration is X, then during the time window, the UE may be scheduled for uplink transmission for duration X, followed by not be schedule for uplink transmission for duration X, periodically.

In certain aspects, the UAI includes information indicative a start time of the requested time window (e.g., validity window), for one or more requested communication cycles (e.g., validity cycles).

In certain aspects, the network entity sends an indication to the UE requesting the UE to send the UAI, such as using RRC. In certain aspects, the UE is configured to send UAI if configured to report IDC TDM assistance information.

In certain aspects, the network entity configures the UE with a communication configuration, such as a DRX configuration, or an IDC specific gap configuration.

Aspects Related to Autonomous Denials

In certain aspects, a UE can be configured to perform autonomous denials. For example, UEs in a cell group may be configured to perform autonomous denials. When configured with autonomous denials, a UE may be allowed to deny up to a maximum number of uplink transmissions. A UE denying an uplink transmission refers to the UE autonomously refraining from transmitting an uplink transmission the UE is scheduled (e.g., by a network entity) to transmit. For example, the network entity may configure the UE with a number of autonomous denial slots, which indicates a maximum number of uplink slots the UE can autonomously deny during an autonomous denial validity period. The autonomous denial validity period is the time period at which the autonomous denial configuration is valid. For example, where the network entity configures the UE with an autonomous denial configuration including 5 autonomous denial slots and an autonomous denial validity period of 200 slots, the UE may be able to refrain from transmitting uplink transmissions in up to 5 slots (where the UE is scheduled to transmit uplink transmission) over 200 consecutive slots.

In certain aspects, an autonomous denial configuration may provide a UE the capability to meet the minimum set of parameters for communicating according to a particular technology, e.g., GNSS. For example, assuming a 15 kHz subcarrier spacing, an autonomous denial configuration including A autonomous denial slots and an autonomous denial validity period of B slots, allows the UE to have an active period for A ms for every B ms. The UE and network entity may then exchange signaling every B ms in a time window (e.g., GNSS receive window) in order to configure the UE to blank A ms out of each B ms in the time window, thereby meeting the minimum set of parameters. However, this may require significant signaling overhead.

As another example, assuming a 15 kHz subcarrier spacing, an autonomous denial configuration including A*100 autonomous denial slots and an autonomous denial validity period of B*100 slots, allows the UE to have an active period for A ms for every B ms, for up to 100*B slots, which may correspond to the duration of a time window (e.g., GNSS receive window) in order to configure the UE to blank A ms out of each B ms in the time window, thereby meeting the minimum set of parameters. However, allowing the UE to autonomously deny such a large number of slots may make uplink communication unreliable.

Accordingly, in certain aspects herein, the UAI includes information indicative of a requested duration (e.g., a requested autonomous denial validity period) during which the UE is allowed to deny up to a requested maximum number of uplink transmissions (e.g., a requested number of autonomous denial slots). The UAI may further include information indicative of the requested maximum number of uplink transmissions the UE is allowed to deny during the requested duration.

In certain aspects, the UAI further includes information indicative of a requested cycle length for a periodically recurring communication cycle (e.g., validity cycle), the periodically recurring communication cycle comprising a first time period corresponding to the requested duration and a second time period. For example, the UE assistance information may provide a periodicity at which the UE requests to be configured with the autonomous denial validity period. For example, the periodicity may be the periodicity of the GNSS receive window. Accordingly, the UE can signal the information once for a set of autonomous denial validity periods, as opposed to signaling the information for each autonomous denial validity period separately, thereby reducing signaling overhead.

In certain aspects, the UAI further includes offset information indicative of, for at least one occurrence of the periodically recurring communication cycle, a start time of the first time period. For example, the offset information indicates when the autonomous denial validity period should occur within a validity cycle.

In certain aspects, the network entity may schedule the UE with an autonomous denial configuration indicating a duration of time the UE is allowed to deny up to a maximum number of uplink transmissions. Accordingly, the UE is able to deny uplink transmissions to instead communicate on another wireless technology, thereby reducing interference between the two wireless technologies at the UE. In certain aspects, the autonomous denial configuration further includes information indicative of a cycle length for a periodically recurring communication cycle, the periodically recurring communication cycle comprising a first time period corresponding to the duration and a second time period. For example, the autonomous denial configuration may provide a periodicity at which the UE is configured with the autonomous denial validity period. For example, the periodicity may be the periodicity of the GNSS receive window. Accordingly, the network entity can signal the information once for a set of repeating autonomous denial validity periods, as opposed to signaling the information for each autonomous denial validity period separately, thereby reducing signaling overhead. In certain aspects, to cancel the autonomous denial configuration, the network entity can send signaling (e.g., RRC signaling) cancelling the autonomous denial configuration or indicating a new autonomous denial configuration.

In certain aspects, the UE is configured to send a report to the network entity, the report indicating a number of uplink transmissions (e.g., slots) the UE denied over a validity period. Accordingly, the network entity can determine which missed uplink transmission are errors versus autonomous denials to better determine radio link issues or errors.

Example Operations by a User Equipment

Figure 9:
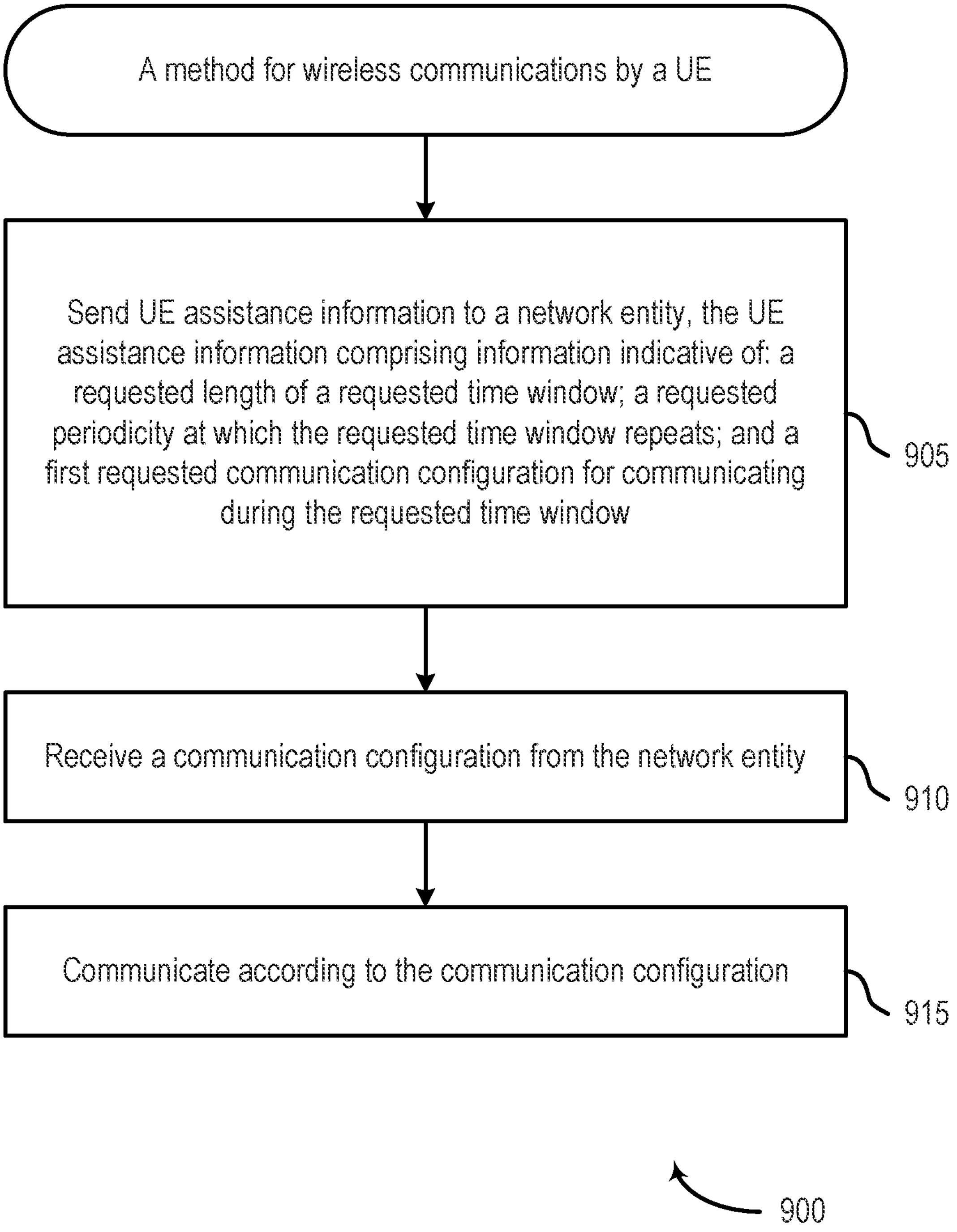
FIG. 9 depicts a method for wireless communications.

FIG. 9 shows a method 900 for wireless communications by a UE, such as UE 104 of FIGS. 1 and 3.

Method 900 begins at step 905 with sending UE assistance information to a network entity, the UE assistance information comprising information indicative of: a requested length of a requested time window; a requested periodicity at which the requested time window repeats; and a first requested communication configuration for communicating during the requested time window.

Method 900 then proceeds to step 910 with receiving a communication configuration from the network entity.

Method 900 then proceeds to step 915 with communicating according to the communication configuration.

In one aspect, the information indicative of the first requested communication configuration comprises information indicative of: a first requested cycle length of a first requested communication cycle, the first requested communication cycle comprising a first requested active time period and a first requested inactive time period, and a first requested duration for the first requested active time period of the first requested communication cycle; the information indicative of the requested periodicity at which the requested time window repeats comprises information indicative of a second requested cycle length of a second requested communication cycle, the second requested communication cycle comprising a first requested time period for communicating according to the first requested communication cycle and a second requested time period; and the information indicative of the requested length of the requested time window comprises information indicative of a second requested duration for the first requested time period of the second requested communication cycle.

In one aspect, method 900 further includes sending first offset information to the network entity, the first offset information indicative of, for at least a first occurrence of the second requested communication cycle, a first start time of the first requested time period.

In one aspect, the at least the first occurrence of the second requested communication cycle comprises multiple occurrences of the second requested communication cycle.

In one aspect, method 900 further includes sending second offset information to the network entity, the second offset information indicative of, for at least a second occurrence of the second requested communication cycle, a second start of the first requested time period.

In one aspect, the communication configuration comprises a DRX configuration comprising information indicative of: a first cycle length of a first communication cycle, the first communication cycle comprising a first on period and a first off period; and a first duration for the first on period of the first communication cycle.

In one aspect, the DRX configuration information further comprises information indicative of: a second cycle length of a second communication cycle, the second communication cycle comprising a first time period for communicating according to the first communication cycle and a second time period; and a second duration for the first time period of the second communication cycle.

In one aspect, the DRX configuration information further comprises information indicative of: a third cycle length of a third communication cycle, the third communication cycle comprising a second on period and a second off period; and a third duration for the second on period of the third communication cycle, wherein the second time period is for communicating according to the third communication cycle.

In one aspect, method 900 further includes receiving signaling prior to a first occurrence of the second communication cycle, the signaling indicating whether to communicate according to the first communication cycle or the third communication cycle during the first time period of the first occurrence of the second communication cycle.

In one aspect, method 900 further includes receiving first offset information indicative of, for at least a first occurrence of the second communication cycle, a start time of the first time period.

In one aspect, method 900 further includes sending first offset information indicative of, for at least a first occurrence of the second communication cycle, a start time of the first time period.

In one aspect, the first requested communication cycle comprises a requested long DRX cycle, and the first requested duration for the first requested active time period comprises an on duration for the requested long DRX cycle.

In one aspect, the UE assistance information further comprises information indicative of a third requested cycle length of a requested long DRX cycle, the first requested communication cycle comprises a requested short DRX cycle, and the first requested duration for the first requested active time period comprises an on duration for the requested long DRX cycle and the requested short DRX cycle.

In one aspect, the UE assistance information further comprises information indicative of a requested maximum number of requested short DRX cycles to occur before entering a requested long DRX cycle.

In one aspect, the information indicative of the first requested communication configuration comprises information indicative of: a requested length of a requested gap period during which the UE is not to be scheduled for uplink transmission; and a requested periodicity at which the requested gap period repeats within the requested time window.

In one aspect, the UE assistance information further comprises information indicative of, for at least one occurrence of a requested communication cycle corresponding to the requested periodicity, a start time of the requested time window.

In one aspect, method 900 further includes receiving an indication to send the UE assistance information.

In one aspect, the communication configuration comprises information indicative of: a length of a time window; a periodicity at which the time window repeats; a length of a gap period during which the UE is not to be scheduled for uplink transmission; and a periodicity at which the gap period repeats within the time window.

In one aspect, the communication configuration comprises information indicative of a DRX configuration.

In one aspect, the information indicative of the first requested communication configuration comprises information indicative of: a requested duty cycle the UE is not to be scheduled for uplink transmission during the requested time window; and a requested maximum consecutive duration the UE can be scheduled for uplink transmission during the requested time window.

Figure 13:
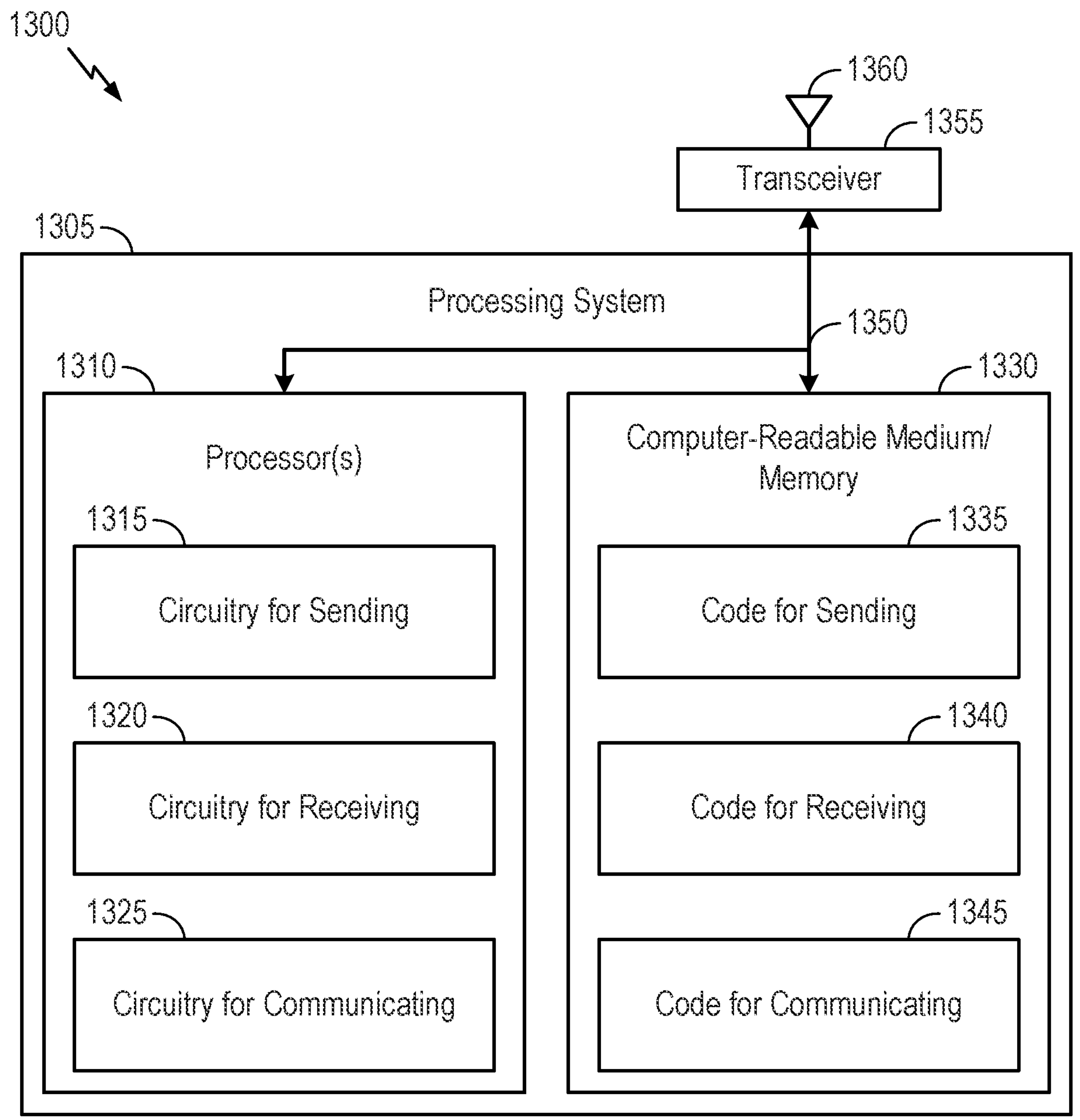
FIG. 13 depicts aspects of an example communications device.

In one aspect, method 900, or any aspect related to it, may be performed by an apparatus, such as communications device 1300 of FIG. 13, which includes various components operable, configured, or adapted to perform the method 900. Communications device 1300 is described below in further detail.

Note that FIG. 9 is just one example of a method, and other methods including fewer, additional, or alternative steps are possible consistent with this disclosure.

Figure 10:
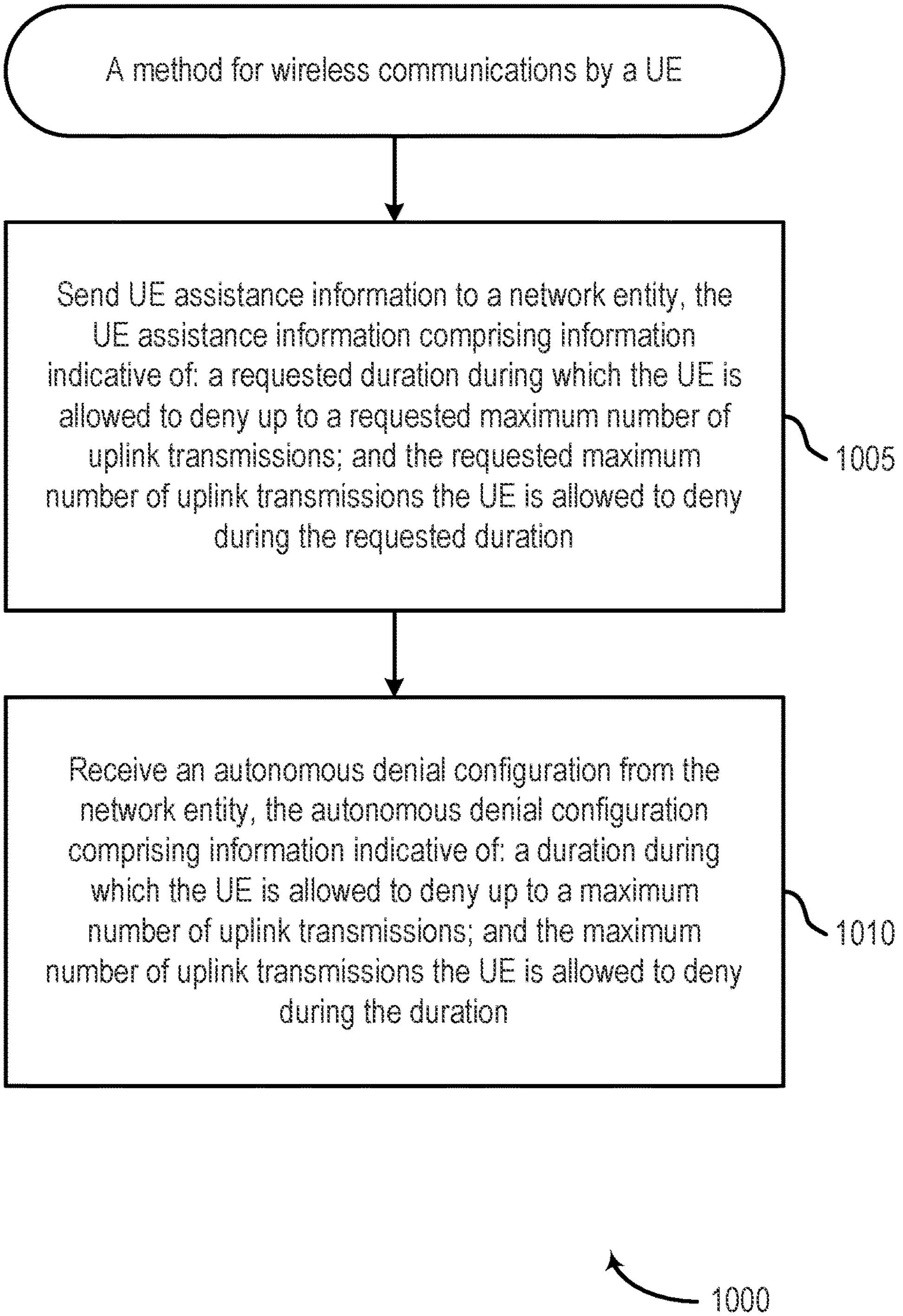
FIG. 10 depicts another method for wireless communications.

FIG. 10 shows a method 1000 for wireless communications by a UE, such as UE 104 of FIGS. 1 and 3.

Method 1000 begins at step 1005 with sending UE assistance information to a network entity, the UE assistance information comprising information indicative of: a requested duration during which the UE is allowed to deny up to a requested maximum number of uplink transmissions; and the requested maximum number of uplink transmissions the UE is allowed to deny during the requested duration.

Method 1000 then proceeds to step 1010 with receiving an autonomous denial configuration from the network entity, the autonomous denial configuration comprising information indicative of: a duration during which the UE is allowed to deny up to a maximum number of uplink transmissions; and the maximum number of uplink transmissions the UE is allowed to deny during the duration.

In one aspect, the UE assistance information further comprises information indicative of a requested cycle length for a periodically recurring communication cycle, the periodically recurring communication cycle comprising a first time period corresponding to the requested duration and a second time period.

In one aspect, the UE assistance information further comprises offset information indicative of, for at least one occurrence of the periodically recurring communication cycle, a start time of the first time period.

In one aspect, the autonomous denial configuration further comprises information indicative of a cycle length for a periodically recurring communication cycle, the periodically recurring communication cycle comprising a first time period corresponding to the duration and a second time period.

In one aspect, method 1000 further includes sending a report to the network entity, the report indicating a number of uplink transmissions the UE denied for the duration.

In one aspect, method 1000, or any aspect related to it, may be performed by an apparatus, such as communications device 1300 of FIG. 13, which includes various components operable, configured, or adapted to perform the method 1000. Communications device 1300 is described below in further detail.

Note that FIG. 10 is just one example of a method, and other methods including fewer, additional, or alternative steps are possible consistent with this disclosure.

Example Operations by a Network Entity

Figure 11:
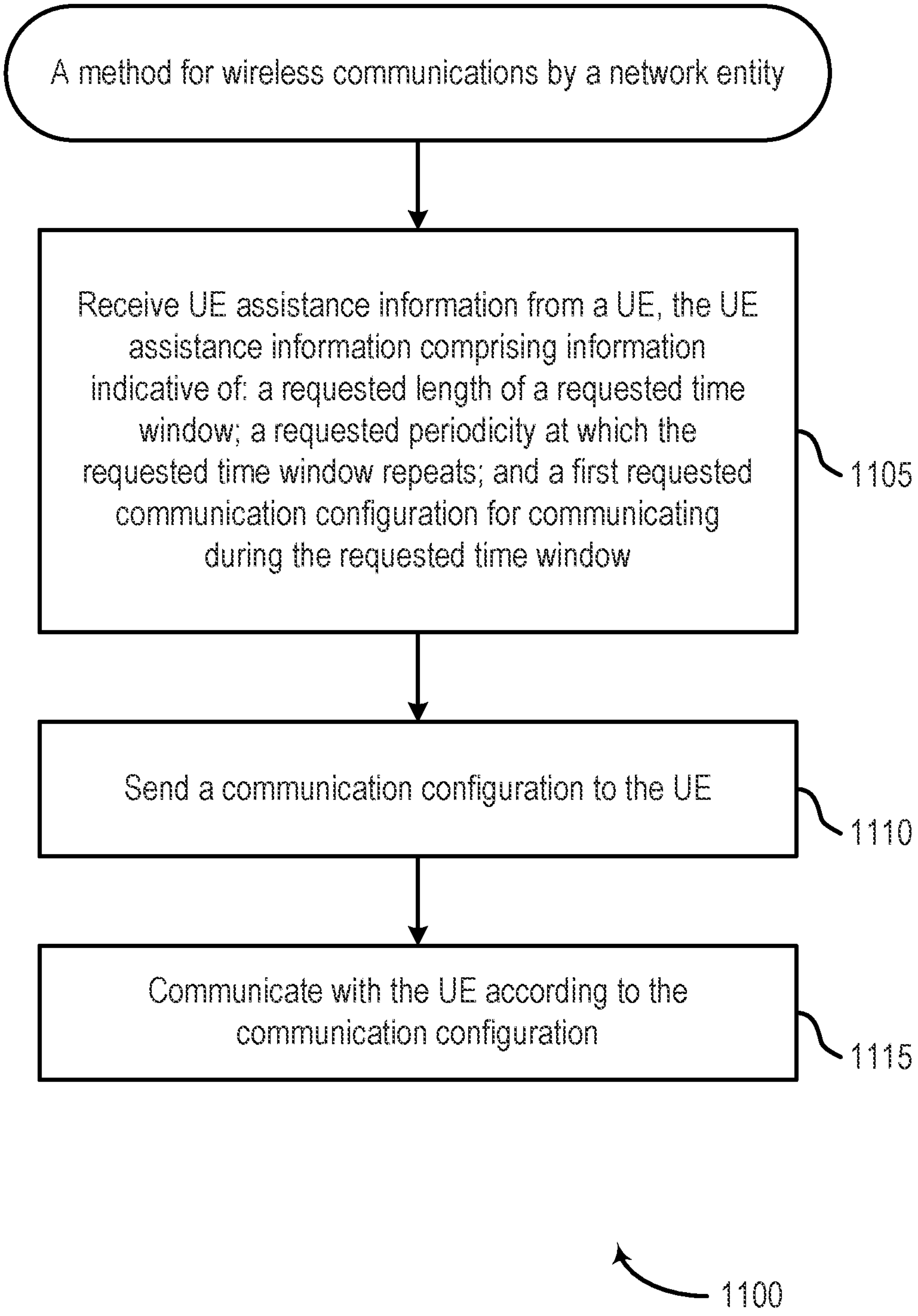
FIG. 11 depicts another method for wireless communications.

FIG. 11 shows a method 1100 for wireless communications by a network entity, such as BS 102 of FIGS. 1 and 3, or a disaggregated base station as discussed with respect to FIG. 2.

Method 1100 begins at step 1105 with receiving UE assistance information from a UE, the UE assistance information comprising information indicative of: a requested length of a requested time window; a requested periodicity at which the requested time window repeats; and a first requested communication configuration for communicating during the requested time window.

Method 1100 then proceeds to step 1110 with sending a communication configuration to the UE.

Method 1100 then proceeds to step 1115 with communicating with the UE according to the communication configuration.

In one aspect, the information indicative of the first requested communication configuration comprises information indicative of: a first requested cycle length of a first requested communication cycle, the first requested communication cycle comprising a first requested active time period and a first requested inactive time period, and a first requested duration for the first requested active time period of the first requested communication cycle; the information indicative of the requested periodicity at which the requested time window repeats comprises information indicative of a second requested cycle length of a second requested communication cycle, the second requested communication cycle comprising a first requested time period for communicating according to the first requested communication cycle and a second requested time period; and the information indicative of the requested length of the requested time window comprises information indicative of a second requested duration for the first requested time period of the second requested communication cycle.

In one aspect, method 1100 further includes receiving first offset information from the UE, the first offset information indicative of, for at least a first occurrence of the second requested communication cycle, a first start time of the first requested time period.

In one aspect, the at least the first occurrence of the second requested communication cycle comprises multiple occurrences of the second requested communication cycle.

In one aspect, method 1100 further includes receiving second offset information from the UE, the second offset information indicative of, for at least a second occurrence of the second requested communication cycle, a second start of the first requested time period.

In one aspect, the communication configuration comprises a DRX configuration comprising information indicative of: a first cycle length of a first communication cycle, the first communication cycle comprising a first on period and a first off period; and a first duration for the first on period of the first communication cycle.

In one aspect, the DRX configuration information further comprises information indicative of: a second cycle length of a second communication cycle, the second communication cycle comprising a first time period for communicating according to the first communication cycle and a second time period; and a second duration for the first time period of the second communication cycle.

In one aspect, the DRX configuration information further comprises information indicative of: a third cycle length of a third communication cycle, the third communication cycle comprising a second on period and a second off period; and a third duration for the second on period of the third communication cycle, wherein the second time period is for communicating according to the third communication cycle.

In one aspect, method 1100 further includes sending signaling prior to a first occurrence of the second communication cycle, the signaling indicating whether to communicate according to the first communication cycle or the third communication cycle during the first time period of the first occurrence of the second communication cycle.

In one aspect, method 1100 further includes sending first offset information indicative of, for at least a first occurrence of the second communication cycle, a start time of the first time period.

In one aspect, method 1100 further includes receiving first offset information indicative of, for at least a first occurrence of the second communication cycle, a start time of the first time period.

In one aspect, the first requested communication cycle comprises a requested long DRX cycle, and the first requested duration for the first requested active time period comprises an on duration for the requested long DRX cycle.

In one aspect, the UE assistance information further comprises information indicative of a third requested cycle length of a requested long DRX cycle, the first requested communication cycle comprises a requested short DRX cycle, and the first requested duration for the first requested active time period comprises an on duration for the requested long DRX cycle and the requested short DRX cycle.

In one aspect, the UE assistance information further comprises information indicative of a requested maximum number of requested short DRX cycles to occur before entering a requested long DRX cycle.

In one aspect, the information indicative of the first requested communication configuration comprises information indicative of: a requested length of a requested gap period during which the UE is not to be scheduled for uplink transmission; and a requested periodicity at which the requested gap period repeats within the requested time window.

In one aspect, the UE assistance information further comprises information indicative of, for at least one occurrence of a requested communication cycle corresponding to the requested periodicity, a start time of the requested time window.

In one aspect, method 1100 further includes sending an indication to send the UE assistance information.

In one aspect, the communication configuration comprises information indicative of: a length of a time window; a periodicity at which the time window repeats; a length of a gap period during which the UE is not to be scheduled for uplink transmission; and a periodicity at which the gap period repeats within the time window.

In one aspect, the communication configuration comprises information indicative of a DRX configuration.

In one aspect, the information indicative of the first requested communication configuration comprises information indicative of: a requested duty cycle the UE is not to be scheduled for uplink transmission during the requested time window; and a requested maximum consecutive duration the UE can be scheduled for uplink transmission during the requested time window.

Figure 14:
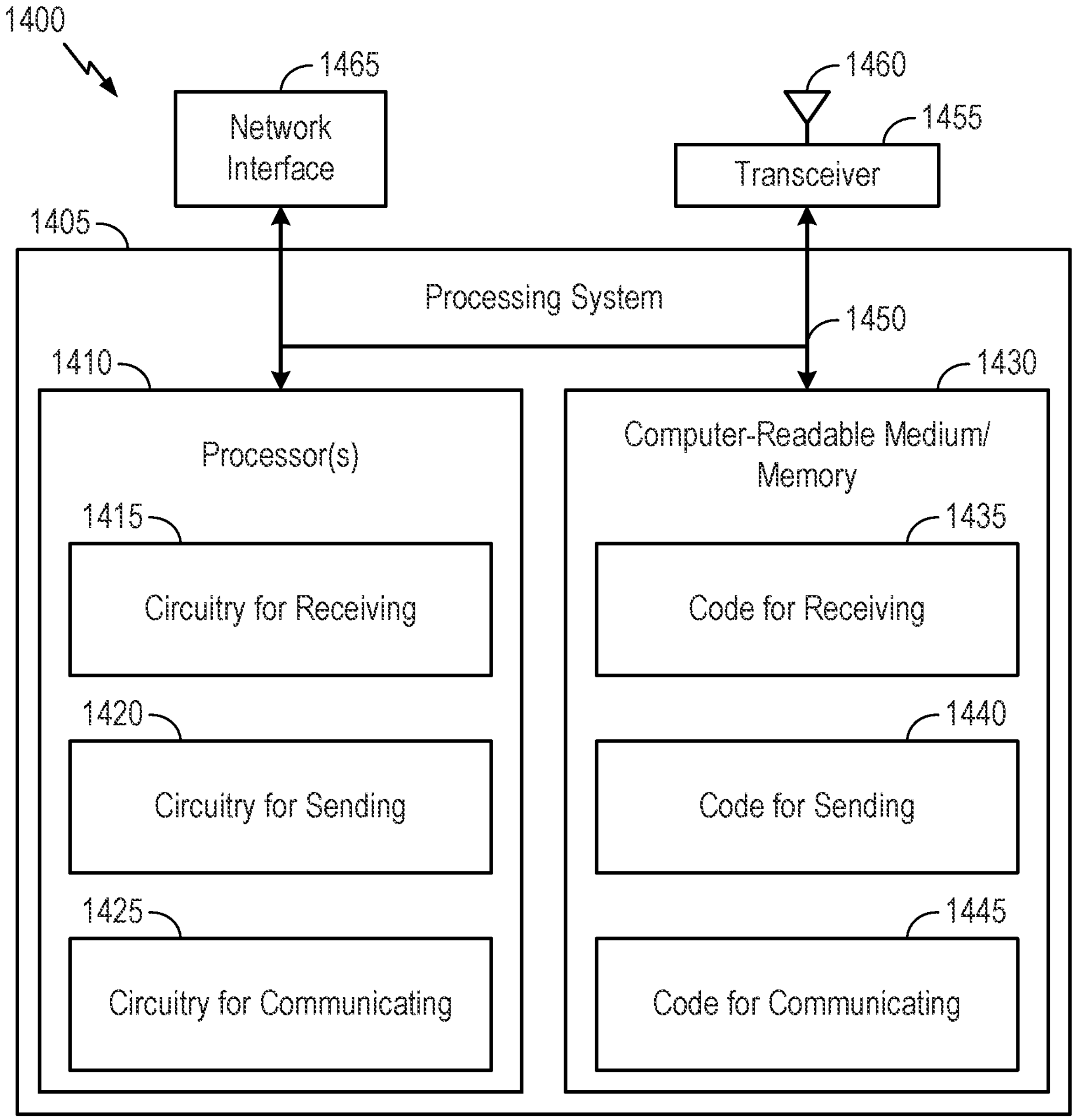
FIG. 14 depicts aspects of an example communications device.

In one aspect, method 1100, or any aspect related to it, may be performed by an apparatus, such as communications device 1400 of FIG. 14, which includes various components operable, configured, or adapted to perform the method 1100. Communications device 1400 is described below in further detail.

Note that FIG. 11 is just one example of a method, and other methods including fewer, additional, or alternative steps are possible consistent with this disclosure.

Figure 12:
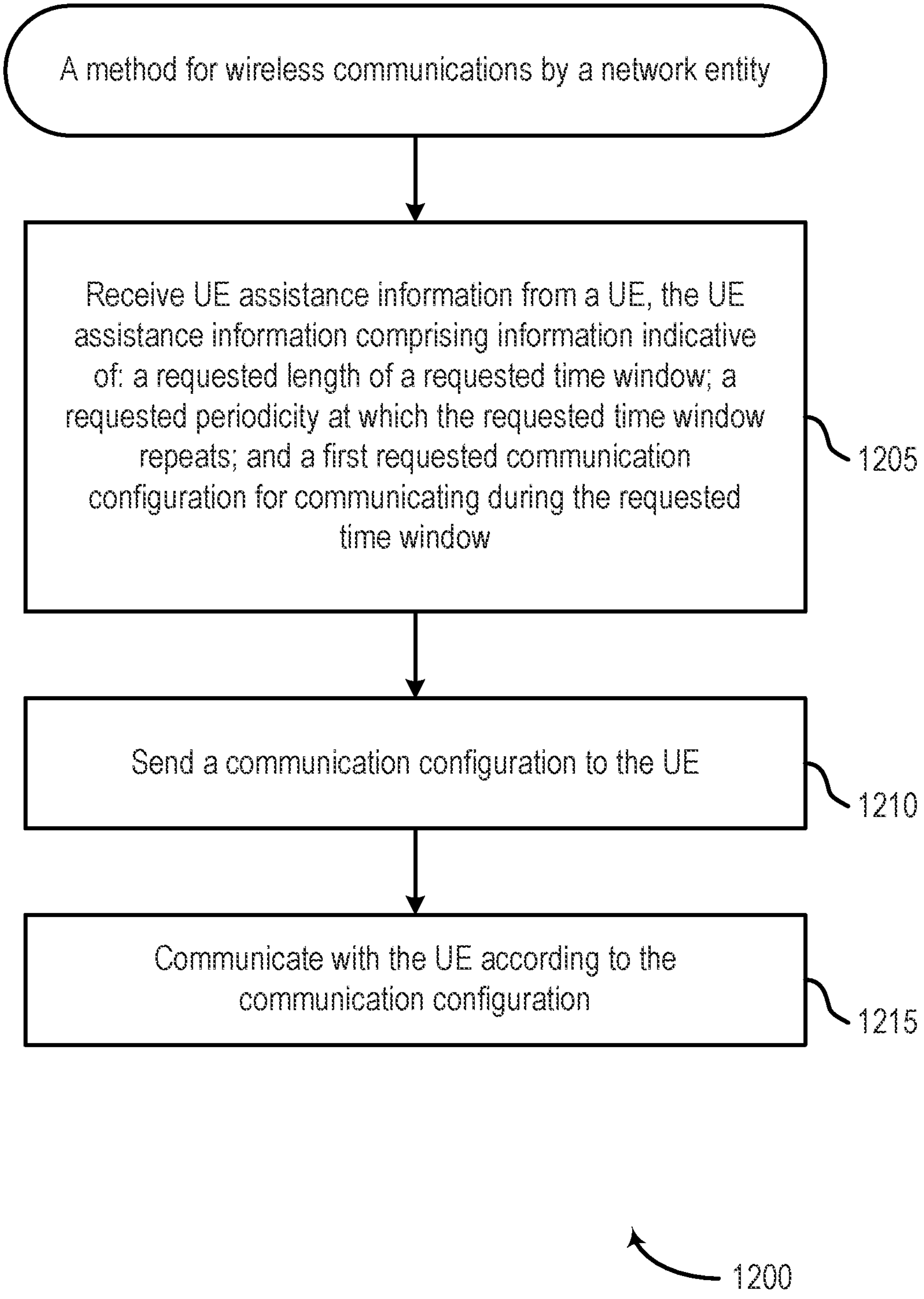
FIG. 12 depicts another method for wireless communications.

FIG. 12 shows a method 1200 for wireless communications by a network entity, such as BS 102 of FIGS. 1 and 3, or a disaggregated base station as discussed with respect to FIG. 2.

Method 1200 begins at step 1205 with receiving UE assistance information from a UE, the UE assistance information comprising information indicative of: a requested duration during which the UE is allowed to deny up to a requested maximum number of uplink transmissions; and the requested maximum number of uplink transmissions the UE is allowed to deny during the requested duration.

Method 1200 then proceeds to step 1210 with sending an autonomous denial configuration to the UE, the autonomous denial configuration comprising information indicative of: a duration during which the UE is allowed to deny up to a maximum number of uplink transmissions; and the maximum number of uplink transmissions the UE is allowed to deny during the duration.

In one aspect, the UE assistance information further comprises information indicative of a requested cycle length for a periodically recurring communication cycle, the periodically recurring communication cycle comprising a first time period corresponding to the requested duration and a second time period.

In one aspect, the UE assistance information further comprises offset information indicative of, for at least one occurrence of the periodically recurring communication cycle, a start time of the first time period.

In one aspect, the autonomous denial configuration further comprises information indicative of a cycle length for a periodically recurring communication cycle, the periodically recurring communication cycle comprising a first time period corresponding to the duration and a second time period.

In one aspect, method 1200 further includes receiving a report from the UE, the report indicating a number of uplink transmissions the UE denied for the duration.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Communications Devices

FIG. 13 depicts aspects of an example communications device 1300. In some aspects, communications device 1300 is a user equipment, such as UE 104 described above with respect to FIGS. 1 and 3.

The communications device 1300 includes a processing system 1305 coupled to a transceiver 1355 (e.g., a transmitter and/or a receiver). The transceiver 1355 is configured to transmit and receive signals for the communications device 1300 via an antenna 1360, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1330 via a bus 1350. In certain aspects, the computer-readable medium/memory 1330 is configured to store instructions (e.g., computer-executable code) that when executed by the one or more processors 1310, enable and cause the one or more processors 1310 to perform the method 900 described with respect to FIG. 9, or any aspect related to it, including any additional steps or sub-steps described in relation to FIG. 9; and the method 1000 described with respect to FIG. 10, or any aspect related to it, including any additional steps or sub-steps described in relation to FIG. 10. Note that reference to a processor performing a function of communications device 1300 may include one or more processors performing that function of communications device 1300, such as in a distributed fashion.

In the depicted example, computer-readable medium/memory 1330 stores code for sending 1335, code for receiving 1340, and code for communicating 1345. Processing of the code 1335-1345 may enable and cause the communications device 1300 to perform the method 900 described with respect to FIG. 9, or any aspect related to it; and the method 1000 described with respect to FIG. 10, or any aspect related to it.

The one or more processors 1310 include circuitry configured to implement (e.g., execute) the code stored in the computer-readable medium/memory 1330, including circuitry for sending 1315, circuitry for receiving 1320, and circuitry for communicating 1325. Processing with circuitry 1315-1325 may enable and cause the communications device 1300 to perform the method 900 described with respect to FIG. 9, or any aspect related to it; and the method 1000 described with respect to FIG. 10, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1355 and/or antenna 1360 of the communications device 1300 in FIG. 13, and/or one or more processors 1310 of the communications device 1300 in FIG. 13. Means for communicating, receiving or obtaining may include the transceivers 354, antenna(s) 352, receive processor 358, and/or controller/processor 380 of the UE 104 illustrated in FIG. 3, transceiver 1355 and/or antenna 1360 of the communications device 1300 in FIG. 13, and/or one or more processors 1310 of the communications device 1300 in FIG. 13.

FIG. 14 depicts aspects of an example communications device. In some aspects, communications device 1400 is a network entity, such as BS 102 of FIGS. 1 and 3, or a disaggregated base station as discussed with respect to FIG. 2.

The communications device 1400 includes a processing system 1405 coupled to a transceiver 1455 (e.g., a transmitter and/or a receiver) and/or a network interface 1465. The transceiver 1455 is configured to transmit and receive signals for the communications device 1400 via an antenna 1460, such as the various signals as described herein. The network interface 1465 is configured to obtain and send signals for the communications device 1400 via communications link(s), such as a backhaul link, midhaul link, and/or fronthaul link as described herein, such as with respect to FIG. 2. The processing system 1405 may be configured to perform processing functions for the communications device 1400, including processing signals received and/or to be transmitted by the communications device 1400.

The processing system 1405 includes one or more processors 1410. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1430 via a bus 1450. In certain aspects, the computer-readable medium/memory 1430 is configured to store instructions (e.g., computer-executable code) that when executed by the one or more processors 1410, enable and cause the one or more processors 1410 to perform the method 1100 described with respect to FIG. 11, or any aspect related to it, including any additional steps or sub-steps described in relation to FIG. 11; and the method 1200 described with respect to FIG. 12, or any aspect related to it, including any additional steps or sub-steps described in relation to FIG. 12. Note that reference to a processor of communications device 1400 performing a function may include one or more processors of communications device 1400 performing that function, such as in a distributed fashion.

In the depicted example, the computer-readable medium/memory 1430 stores code for receiving 1435, code for sending 1440, and code for communicating 1445. Processing of the code 1435-1445 may enable and cause the communications device 1400 to perform the method 1100 described with respect to FIG. 11, or any aspect related to it; and the method 1200 described with respect to FIG. 12, or any aspect related to it.

The one or more processors 1410 include circuitry configured to implement (e.g., execute) the code stored in the computer-readable medium/memory 1430, including circuitry for receiving 1415, circuitry for sending 1420, and circuitry for communicating 1425. Processing with circuitry 1415-1425 may enable and cause the communications device 1400 to perform the method 1100 described with respect to FIG. 11, or any aspect related to it; and the method 1200 described with respect to FIG. 12, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1455 and/or antenna 1460 of the communications device 1400 in FIG. 14, and/or one or more processors 1410 of the communications device 1400 in FIG. 14. Means for communicating, receiving or obtaining may include the transceivers 332, antenna(s) 334, receive processor 338, and/or controller/processor 340 of the BS 102 illustrated in FIG. 3, transceiver 1455 and/or antenna 1460 of the communications device 1400 in FIG. 14, and/or one or more processors 1410 of the communications device 1400 in FIG. 14.

Example Clauses

Implementation examples are described in the following numbered clauses:

Clause 1: A method for wireless communications by a UE comprising: sending UE assistance information to a network entity, the UE assistance information comprising information indicative of: a requested length of a requested time window; a requested periodicity at which the requested time window repeats; and a first requested communication configuration for communicating during the requested time window; receiving a communication configuration from the network entity; and communicating according to the communication configuration.

Clause 2: The method of Clause 1, wherein: the information indicative of the first requested communication configuration comprises information indicative of: a first requested cycle length of a first requested communication cycle, the first requested communication cycle comprising a first requested active time period and a first requested inactive time period, and a first requested duration for the first requested active time period of the first requested communication cycle; the information indicative of the requested periodicity at which the requested time window repeats comprises information indicative of a second requested cycle length of a second requested communication cycle, the second requested communication cycle comprising a first requested time period for communicating according to the first requested communication cycle and a second requested time period; and the information indicative of the requested length of the requested time window comprises information indicative of a second requested duration for the first requested time period of the second requested communication cycle.

Clause 3: The method of Clause 2, further comprising: sending first offset information to the network entity, the first offset information indicative of, for at least a first occurrence of the second requested communication cycle, a first start time of the first requested time period.

Clause 4: The method of Clause 3, wherein the at least the first occurrence of the second requested communication cycle comprises multiple occurrences of the second requested communication cycle.

Clause 5: The method of Clause 3, further comprising: sending second offset information to the network entity, the second offset information indicative of, for at least a second occurrence of the second requested communication cycle, a second start of the first requested time period.

Clause 6: The method of Clause 2, wherein the communication configuration comprises a DRX configuration comprising information indicative of: a first cycle length of a first communication cycle, the first communication cycle comprising a first on period and a first off period; and a first duration for the first on period of the first communication cycle.

Clause 7: The method of Clause 6, wherein the DRX configuration information further comprises information indicative of: a second cycle length of a second communication cycle, the second communication cycle comprising a first time period for communicating according to the first communication cycle and a second time period; and a second duration for the first time period of the second communication cycle.

Clause 8: The method of Clause 7, wherein the DRX configuration information further comprises information indicative of: a third cycle length of a third communication cycle, the third communication cycle comprising a second on period and a second off period; and a third duration for the second on period of the third communication cycle, wherein the second time period is for communicating according to the third communication cycle.

Clause 9: The method of Clause 8, further comprising: receiving signaling prior to a first occurrence of the second communication cycle, the signaling indicating whether to communicate according to the first communication cycle or the third communication cycle during the first time period of the first occurrence of the second communication cycle.

Clause 10: The method of Clause 7, further comprising: receiving first offset information indicative of, for at least a first occurrence of the second communication cycle, a start time of the first time period.

Clause 11: The method of Clause 7, further comprising: sending first offset information indicative of, for at least a first occurrence of the second communication cycle, a start time of the first time period.

Clause 12: The method of Clause 2, wherein: the first requested communication cycle comprises a requested long DRX cycle, and the first requested duration for the first requested active time period comprises an on duration for the requested long DRX cycle.

Clause 13: The method of Clause 2, wherein: the UE assistance information further comprises information indicative of a third requested cycle length of a requested long DRX cycle, the first requested communication cycle comprises a requested short DRX cycle, and the first requested duration for the first requested active time period comprises an on duration for the requested long DRX cycle and the requested short DRX cycle.

Clause 14: The method of Clause 13, wherein the UE assistance information further comprises information indicative of a requested maximum number of requested short DRX cycles to occur before entering a requested long DRX cycle.

Clause 15: The method of Clause 1, wherein: the information indicative of the first requested communication configuration comprises information indicative of: a requested length of a requested gap period during which the UE is not to be scheduled for uplink transmission; and a requested periodicity at which the requested gap period repeats within the requested time window.

Clause 16: The method of any one of Clauses 1-15, wherein the UE assistance information further comprises information indicative of, for at least one occurrence of a requested communication cycle corresponding to the requested periodicity, a start time of the requested time window.

Clause 17: The method of any one of Clauses 1-16, further comprising: receiving an indication to send the UE assistance information.

Clause 18: The method of Clause 1-17, wherein the communication configuration comprises information indicative of: a length of a time window; a periodicity at which the time window repeats; a length of a gap period during which the UE is not to be scheduled for uplink transmission; and a periodicity at which the gap period repeats within the time window.

Clause 19: The method of any one of Clauses 1-18, wherein the communication configuration comprises information indicative of a DRX configuration.

Clause 20: The method of any one of Clauses 16-19, wherein: the information indicative of the first requested communication configuration comprises information indicative of: a requested duty cycle the UE is not to be scheduled for uplink transmission during the requested time window; and a requested maximum consecutive duration the UE can be scheduled for uplink transmission during the requested time window.

Clause 21: A method for wireless communications by a UE comprising: sending UE assistance information to a network entity, the UE assistance information comprising information indicative of: a requested duration during which the UE is allowed to deny up to a requested maximum number of uplink transmissions; and the requested maximum number of uplink transmissions the UE is allowed to deny during the requested duration; and receiving an autonomous denial configuration from the network entity, the autonomous denial configuration comprising information indicative of: a duration during which the UE is allowed to deny up to a maximum number of uplink transmissions; and the maximum number of uplink transmissions the UE is allowed to deny during the duration.

Clause 22: The method of Clause 21, wherein the UE assistance information further comprises information indicative of a requested cycle length for a periodically recurring communication cycle, the periodically recurring communication cycle comprising a first time period corresponding to the requested duration and a second time period.

Clause 23: The method of Clause 22, wherein the UE assistance information further comprises offset information indicative of, for at least one occurrence of the periodically recurring communication cycle, a start time of the first time period.

Clause 24: The method of any one of Clauses 21-23, wherein the autonomous denial configuration further comprises information indicative of a cycle length for a periodically recurring communication cycle, the periodically recurring communication cycle comprising a first time period corresponding to the duration and a second time period.

Clause 25: The method of any one of Clauses 21-24, further comprising: sending a report to the network entity, the report indicating a number of uplink transmissions the UE denied for the duration.

Clause 26: A method for wireless communications by a network entity comprising: receiving UE assistance information from a UE, the UE assistance information comprising information indicative of: a requested length of a requested time window; a requested periodicity at which the requested time window repeats; and a first requested communication configuration for communicating during the requested time window; sending a communication configuration to the UE; and communicating with the UE according to the communication configuration.

Clause 27: The method of Clause 26, wherein: the information indicative of the first requested communication configuration comprises information indicative of: a first requested cycle length of a first requested communication cycle, the first requested communication cycle comprising a first requested active time period and a first requested inactive time period, and a first requested duration for the first requested active time period of the first requested communication cycle; the information indicative of the requested periodicity at which the requested time window repeats comprises information indicative of a second requested cycle length of a second requested communication cycle, the second requested communication cycle comprising a first requested time period for communicating according to the first requested communication cycle and a second requested time period; and the information indicative of the requested length of the requested time window comprises information indicative of a second requested duration for the first requested time period of the second requested communication cycle.

Clause 28: The method of Clause 27, further comprising: receiving first offset information from the UE, the first offset information indicative of, for at least a first occurrence of the second requested communication cycle, a first start time of the first requested time period.

Clause 29: The method of Clause 28, wherein the at least the first occurrence of the second requested communication cycle comprises multiple occurrences of the second requested communication cycle.

Clause 30: The method of Clause 28, further comprising: receiving second offset information from the UE, the second offset information indicative of, for at least a second occurrence of the second requested communication cycle, a second start of the first requested time period.

Clause 31: The method of Clause 27, wherein the communication configuration comprises a DRX configuration comprising information indicative of: a first cycle length of a first communication cycle, the first communication cycle comprising a first on period and a first off period; and a first duration for the first on period of the first communication cycle.

Clause 32: The method of Clause 31, wherein the DRX configuration information further comprises information indicative of: a second cycle length of a second communication cycle, the second communication cycle comprising a first time period for communicating according to the first communication cycle and a second time period; and a second duration for the first time period of the second communication cycle.

Clause 33: The method of Clause 32, wherein the DRX configuration information further comprises information indicative of: a third cycle length of a third communication cycle, the third communication cycle comprising a second on period and a second off period; and a third duration for the second on period of the third communication cycle, wherein the second time period is for communicating according to the third communication cycle.

Clause 34: The method of Clause 33, further comprising: sending signaling prior to a first occurrence of the second communication cycle, the signaling indicating whether to communicate according to the first communication cycle or the third communication cycle during the first time period of the first occurrence of the second communication cycle.

Clause 35: The method of Clause 32, further comprising: sending first offset information indicative of, for at least a first occurrence of the second communication cycle, a start time of the first time period.

Clause 36: The method of Clause 32, further comprising: receiving first offset information indicative of, for at least a first occurrence of the second communication cycle, a start time of the first time period.

Clause 37: The method of Clause 27, wherein: the first requested communication cycle comprises a requested long DRX cycle, and the first requested duration for the first requested active time period comprises an on duration for the requested long DRX cycle.

Clause 38: The method of Clause 27, wherein: the UE assistance information further comprises information indicative of a third requested cycle length of a requested long DRX cycle, the first requested communication cycle comprises a requested short DRX cycle, and the first requested duration for the first requested active time period comprises an on duration for the requested long DRX cycle and the requested short DRX cycle.

Clause 39: The method of Clause 38, wherein the UE assistance information further comprises information indicative of a requested maximum number of requested short DRX cycles to occur before entering a requested long DRX cycle.

Clause 40: The method of Clause 26, wherein: the information indicative of the first requested communication configuration comprises information indicative of: a requested length of a requested gap period during which the UE is not to be scheduled for uplink transmission; and a requested periodicity at which the requested gap period repeats within the requested time window.

Clause 41: The method of any one of Clauses 26-40, wherein the UE assistance information further comprises information indicative of, for at least one occurrence of a requested communication cycle corresponding to the requested periodicity, a start time of the requested time window.

Clause 42: The method of any one of Clauses 26-41, further comprising: sending an indication to send the UE assistance information.

Clause 43: The method of any one of Clauses 26-42, wherein the communication configuration comprises information indicative of: a length of a time window; a periodicity at which the time window repeats; a length of a gap period during which the UE is not to be scheduled for uplink transmission; and a periodicity at which the gap period repeats within the time window.

Clause 44: The method of any one of Clauses 26-43, wherein the communication configuration comprises information indicative of a DRX configuration.

Clause 45: The method of any one of Clauses 41-44, wherein: the information indicative of the first requested communication configuration comprises information indicative of: a requested duty cycle the UE is not to be scheduled for uplink transmission during the requested time window; and a requested maximum consecutive duration the UE can be scheduled for uplink transmission during the requested time window.

Clause 46: A method for wireless communications by a network entity comprising: receiving UE assistance information from a UE, the UE assistance information comprising information indicative of: a requested duration during which the UE is allowed to deny up to a requested maximum number of uplink transmissions; and the requested maximum number of uplink transmissions the UE is allowed to deny during the requested duration; and sending an autonomous denial configuration to the UE, the autonomous denial configuration comprising information indicative of: a duration during which the UE is allowed to deny up to a maximum number of uplink transmissions; and the maximum number of uplink transmissions the UE is allowed to deny during the duration.

Clause 47: The method of Clause 46, wherein the UE assistance information further comprises information indicative of a requested cycle length for a periodically recurring communication cycle, the periodically recurring communication cycle comprising a first time period corresponding to the requested duration and a second time period.

Clause 48: The method of Clause 47, wherein the UE assistance information further comprises offset information indicative of, for at least one occurrence of the periodically recurring communication cycle, a start time of the first time period.

Clause 49: The method of any one of Clauses 46-48, wherein the autonomous denial configuration further comprises information indicative of a cycle length for a periodically recurring communication cycle, the periodically recurring communication cycle comprising a first time period corresponding to the duration and a second time period.

Clause 50: The method of any one of Clauses 46-49, further comprising: receiving a report from the UE, the report indicating a number of uplink transmissions the UE denied for the duration.

Clause 51: One or more apparatuses, comprising: memory comprising executable instructions; and one or more processors configured to execute the executable instructions and cause the one or more apparatuses to perform a method in accordance with any one of clauses 1-50.

Clause 52: One or more apparatuses, comprising means for performing a method in accordance with any one of clauses 1-50.

Clause 53: One or more non-transitory computer-readable media comprising executable instructions that, when executed by one or more processors of one or more apparatuses, cause the one or more apparatuses to perform a method in accordance with any one of clauses 1-50.

Clause 54: One or more computer program products embodied on one or more computer-readable storage media comprising code for performing a method in accordance with any one of clauses 1-50.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:

one or more memories; and one or more processors coupled to the one or more memories and configured to cause the apparatus to:

send user equipment (UE) assistance information to a network entity, the UE assistance information comprising information indicative of:

a requested length of a requested time window;

a requested periodicity at which the requested time window repeats; and a first requested communication configuration for communicating during the requested time window;

receive a communication configuration from the network entity; and communicate according to the communication configuration, wherein:

the information indicative of the first requested communication configuration comprises information indicative of:

a first requested cycle length of a first requested communication cycle, the first requested communication cycle comprising a first requested active time period and a first requested inactive time period; and a first requested duration for the first requested active time period of the first requested communication cycle;

the information indicative of the requested periodicity at which the requested time window repeats comprises information indicative of a second requested cycle length of a second requested communication cycle, the second requested communication cycle comprising a first requested time period for communicating according to the first requested communication cycle and a second requested time period; and the information indicative of the requested length of the requested time window comprises information indicative of a second requested duration for the first requested time period of the second requested communication cycle.

2. The apparatus of claim 1, wherein the one or more processors are configured to cause the apparatus to:

send first offset information to the network entity, the first offset information indicative of, for at least a first occurrence of the second requested communication cycle, a first start time of the first requested time period.

3. The apparatus of claim 1, wherein the communication configuration comprises a discontinuous reception (DRX) configuration comprising information indicative of:

a first cycle length of a first communication cycle, the first communication cycle comprising a first on period and a first off period; and a first duration for the first on period of the first communication cycle.

4. The apparatus of claim 3, wherein the DRX configuration information further comprises information indicative of:

a second cycle length of a second communication cycle, the second communication cycle comprising a first time period for communicating according to the first communication cycle and a second time period; and a second duration for the first time period of the second communication cycle.

5. The apparatus of claim 4, wherein the DRX configuration information further comprises information indicative of:

a third cycle length of a third communication cycle, the third communication cycle comprising a second on period and a second off period; and a third duration for the second on period of the third communication cycle, wherein the second time period is for communicating according to the third communication cycle.

6. The apparatus of claim 4, wherein the one or more processors are configured to cause the apparatus to:

receive first offset information indicative of, for at least a first occurrence of the second communication cycle, a start time of the first time period.

7. The apparatus of claim 4, wherein the one or more processors are configured to cause the apparatus to:

send first offset information indicative of, for at least a first occurrence of the second communication cycle, a start time of the first time period.

8. The apparatus of claim 1, wherein:

the first requested communication cycle comprises a requested long discontinuous reception (DRX) cycle, and the first requested duration for the first requested active time period comprises an on duration for the requested long DRX cycle.

9. The apparatus of claim 1, wherein:

the UE assistance information further comprises information indicative of a third requested cycle length of a requested long discontinuous reception (DRX) cycle, the first requested communication cycle comprises a requested short DRX cycle, and the first requested duration for the first requested active time period comprises an on duration for the requested long DRX cycle and the requested short DRX cycle.

10. A method for wireless communications at a user equipment (UE), comprising:

sending UE assistance information to a network entity, the UE assistance information comprising information indicative of:

a requested length of a requested time window;

a requested periodicity at which the requested time window repeats; and a first requested communication configuration for communicating during the requested time window;

receiving a communication configuration from the network entity; and communicating according to the communication configuration, wherein:

the information indicative of the first requested communication configuration comprises information indicative of:

a first requested cycle length of a first requested communication cycle, the first requested communication cycle comprising a first requested active time period and a first requested inactive time period; and a first requested duration for the first requested active time period of the first requested communication cycle;

the information indicative of the requested periodicity at which the requested time window repeats comprises information indicative of a second requested cycle length of a second requested communication cycle, the second requested communication cycle comprising a first requested time period for communicating according to the first requested communication cycle and a second requested time period; and the information indicative of the requested length of the requested time window comprises information indicative of a second requested duration for the first requested time period of the second requested communication cycle.

11. The method of claim 10, wherein method comprises:

sending first offset information to the network entity, the first offset information indicative of, for at least a first occurrence of the second requested communication cycle, a first start time of the first requested time period.

12. The method of claim 10, wherein the communication configuration comprises a discontinuous reception (DRX) configuration comprising information indicative of:

a first cycle length of a first communication cycle, the first communication cycle comprising a first on period and a first off period; and a first duration for the first on period of the first communication cycle.

13. The method of claim 12, wherein the DRX configuration information further comprises information indicative of:

a second cycle length of a second communication cycle, the second communication cycle comprising a first time period for communicating according to the first communication cycle and a second time period; and a second duration for the first time period of the second communication cycle.

14. The method of claim 13, wherein the DRX configuration information further comprises information indicative of:

a third cycle length of a third communication cycle, the third communication cycle comprising a second on period and a second off period; and a third duration for the second on period of the third communication cycle, wherein the second time period is for communicating according to the third communication cycle.

15. The method of claim 13, wherein the method comprises:

receiving first offset information indicative of, for at least a first occurrence of the second communication cycle, a start time of the first time period.

16. The method of claim 13, wherein the method comprises:

sending first offset information indicative of, for at least a first occurrence of the second communication cycle, a start time of the first time period.

17. The method of claim 10, wherein:

the first requested communication cycle comprises a requested long discontinuous reception (DRX) cycle, and the first requested duration for the first requested active time period comprises an on duration for the requested long DRX cycle.

18. The method of claim 10, wherein:

the UE assistance information further comprises information indicative of a third requested cycle length of a requested long discontinuous reception (DRX) cycle, the first requested communication cycle comprises a requested short DRX cycle, and the first requested duration for the first requested active time period comprises an on duration for the requested long DRX cycle and the requested short DRX cycle.

19. The method of claim 10, wherein:

the information indicative of the first requested communication configuration comprises information indicative of a requested length of a requested gap period during which the apparatus is not to be scheduled for uplink transmission, and a requested periodicity at which the requested gap period repeats within the requested time window; or the information indicative of the first requested communication configuration comprises information indicative of a requested duty cycle the apparatus is not to be scheduled for uplink transmission during the requested time window, and a requested maximum consecutive duration the apparatus can be scheduled for uplink transmission during the requested time window.

20. The method of claim 19, wherein:

the information indicative of the first requested communication configuration comprises information indicative of:

the requested length of the requested gap period during which the apparatus is not to be scheduled for uplink transmission; and the requested periodicity at which the requested gap period repeats within the requested time window.

21. The method of claim 19, wherein:

the information indicative of the first requested communication configuration comprises information indicative of:

the requested duty cycle the apparatus is not to be scheduled for uplink transmission during the requested time window; and the requested maximum consecutive duration the apparatus can be scheduled for uplink transmission during the requested time window.

22. The method of claim 10, wherein the communication configuration comprises information indicative of:

a length of a time window;

a periodicity at which the time window repeats;

a length of a gap period during which the apparatus is not to be scheduled for uplink transmission; and a periodicity at which the gap period repeats within the time window.

* * * * *